United States Patent [19]
Freund et al.

[11] Patent Number: 5,809,497
[45] Date of Patent: Sep. 15, 1998

[54] DATABANK SYSTEM WITH METHODS FOR EFFICIENTLY STORING NON UNIFORMS DATA RECORDS

[75] Inventors: Gregor P. Freund, San Francisco; Philippe R. Kahn; Sonia Lee, both of Scotts Valley, all of Calif.

[73] Assignee: Starfish Software, Inc., Scotts Valley, Calif.

[21] Appl. No.: 958,502

[22] Filed: Oct. 27, 1997

Related U.S. Application Data

[62] Division of Ser. No. 451,734, May 26, 1995, Pat. No. 5,682,524.

[51] Int. Cl.$^6$ .................................................. G06F 17/30
[52] U.S. Cl. ........................................................ 707/2
[58] Field of Search ..................................................... 707/2

[56] References Cited

U.S. PATENT DOCUMENTS

| | | | |
|---|---|---|---|
| 4,768,144 | 8/1988 | Winter et al. | 707/1 |
| 5,257,185 | 10/1993 | Farley et al. | 707/100 |
| 5,560,007 | 9/1996 | Thai | 707/3 |
| 5,561,793 | 10/1996 | Bennett et al. | 707/201 |
| 5,608,898 | 3/1997 | Turpin et al. | 707/201 |
| 5,655,116 | 8/1997 | Kirk et al. | 707/1 |
| 5,666,526 | 9/1997 | Reiter et al. | 707/2 |
| 5,682,524 | 10/1997 | Freund et al. | 707/5 |
| 5,727,196 | 3/1998 | Strauss, Jr. et al. | 707/2 |
| 5,745,712 | 4/1998 | Turpin et al. | 395/333 |

*Primary Examiner*—Wayne Amsbury
*Attorney, Agent, or Firm*—John A. Smart

[57] ABSTRACT

System and methods are described for efficient storage and processing of non-uniform data records. An exemplary embodiment includes a Databank system having a Database Engine, a Database Engine API (Application Program Interface), a Databank Engine, a Databank Engine Class Interface, and a Databank (storage). The Databank storage itself comprises a Descriptor Table (Form Definition) and a Data Repository. The Descriptor Table comprises a plurality of field descriptors for characterizing user information stored in the Databank. The Data Repository, on the other hand, stores the actual data from the non-uniform data records. It comprises "static" fields and a "dynamic" field. The static fields store core fields necessary for characterizing each data record (irrespective of what type of information a given data record stores). User data are stored in a structured, pre-defined manner using logical fields (or "subfields") of the dynamic field. The system correctly interprets the dynamic contents based on the information stored in the descriptors. Methods are described for storing and retrieving information from the Databank in a manner which is transparent to clients, thus allowing the Databank subsystem to easily replace existing storage subsystems.

13 Claims, 14 Drawing Sheets

DATABANK SYSTEM WITH METHODS FOR EFFICIENTLY STORING NON UNIFORMS DATA RECORDS

The present application is a division of application Ser. No. 08/451,734, filed May 26, 1995, now U.S. Pat. No. 5,682,524.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments, and more particularly to systems requiring management, storage, and retrieval of diverse or non-uniform information.

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like. A Database Management System (DBMS) is the computer system that allows users to exploit the power of databases.

Traditional databases, such as ones employing the well-known relational database model approach, typically employ a separate database table for each kind of data to be managed. The basic assumption underlying the approach is that the data to be managed consists of a large number of very similar types of data. A corporation may, for example, have hundreds of "Customer" records, or thousands of "Invoice" records. Still further, the "Invoice" records may beget tens of thousands of "Line Item" records. The central notion underlying this approach is that each collection of records (i.e., "table") stores similar information—each having essentially fixed contents. In a customer table, for instance, each customer record would include a First Name, a Last Name, an Address, and the like. Each of these information "type" is, in turn, stored in a particular "field" of the record (e.g., Address field of the Customer record). The general construction and operation of a database management system, including relational ones, is known in the art. See e.g., Date, C., An Introduction to Database Systems, Volumes I and II, Addison Wesley, 1990; the disclosures of which are hereby incorporated by reference.

Employing the relational database approach of how information is organized or modeled, a system designer would typically implement such a system with a particular storage mechanism and optimizations thereof. Designers employing the popular relational database model approach would, for instance, proceed by creating a separate table or "relation" for each type of information (e.g., Customer table, Invoice table, and the like) and then define "links" between the tables, for establishing how information is related. All the while, the assumption is being made that one is dealing with a relatively small set of tables, with each table having records storing similar information.

Although the approach has served the needs of business users well, it is problematic when applied to environments requiring the modeling of non-uniform or dissimilar information. For the data storage needs of home users, for example, the problem exists of how one may effectively store items which are not similar and may in fact be quite dissimilar. "Effectively store," in this context, means a storage mechanism which preserves the functionality/utility normally associated with traditional systems, including searching, "browsing," performing "lookups," and the like, but provides this for items which are not similar. A home user may, for instance, want to manage information about life insurance, car loans, car service, personal health, and so forth and so on. For each type of information, the user may have only a few "records" and, often, only one record. Even in instances of multiple records of one type, the number of such records will generally be low, typically less than 20. Because of the information managed by home users is generally very diverse, the traditional approach of dividing the information to be modeled into a small number of similar-information tables simply fails. If this diverse information were to be stored by grouping together similar information into records to be stored in a single table, the information would require dozens of tables, or more. At best, the approach is wasteful of resources.

Although the basic problem has beep. stated in terms of the disparate information desired to be managed by a home user, the problem has implications for other environments. Consider, for example, the task of automating a particular office environment. The office may track information about utility bills, rent, insurance, clients, and so forth. The information managed by offices has, to a large extent, not been automated, since no practical mechanism for handling such diverse information has existed. Instead, the office would settle for automating one or two particular aspects of its information, such as an accounts payable system for tracking invoices or a payroll system for tracking employee salaries (using the above-described traditional storage architecture and methodology). At best, only a few types of office information have been automated, with each type typically being managed by a particular dedicated system (e.g., accounts payable system).

For environments where the number of different style records numbers in the dozens or even hundreds, whether it be information of a home user or office information, the traditional approach to information storage/management is totally impractical. True "office automation" using a traditional database system would, as in the case of the home user, requires a database file or table for each of these different style records—each type requiring maintenance of a separate file on the computer's storage disk. As each table has a certain amount of overhead associated with it, managing such a large number of tables would waste system resources and degrade system performance to an unacceptable level. All told, such an approach is highly inefficient and, thus, not practical to implement.

One approach to addressing the problem is to just store the disparate information in a single, large "BLOB" (Binary Large Object) field. This approach is also problematic, however. In a BLOB field, the stored data is completely unstructured—simply existing as a block of bytes. In this unstructured state, the information cannot participate in conventional structured operations, such as "views" and "lookups." Admittedly, some rudimentary methods may be applied to a BLOB field, such as generic or brute-force text searching. The results are limited. A query of Last Name= 'Freund' and State='California', for instance, is simply not supported. By and large, the BLOB field approach does not serve to satisfy typical data processing needs.

What is needed are system and methods which provide for the efficient storage of non-similar information yet, at the same time, provide the database tools that users have come to expect. In particular, such a system would store records of various styles or formats without incurring substantial penalty in terms of system performance or use of resources. At the same time, such a system would allow the information to be processed using traditional database tools and methodology, such as indexing/searching, browsing, performing queries, and the like. The present invention fulfills this and other needs.

SUMMARY OF THE INVENTION

The present invention recognizes a need for providing efficient storage of non-similar information. Accordingly, the present invention provides a system and methods for storing records of various styles and/or formats in a fashion which does not incur substantial overhead or performance penalty. Additionally, traditional database functionality (e.g., lookups and queries) is preserved.

According to one embodiment, a Databank is provided as a single, central storage mechanism for all user information, regardless of a particular format (i.e., data record type) in which the information may exist. The Databank includes a Databank table comprising a plurality of records having "static" fields and a single "dynamic" field (comprising various logical fields or "subfields"). These are used in conjunction with one or more Form Definitions having field descriptors. Using the Databank approach of the present invention, new types of information (e.g., new styles of records) may be added to the system without restructuring the stored data.

The static fields store descriptor information common to all data records and are thus core fields necessary for each of the data records, irrespective of what type of information a given data record stores. The actual data from the non-uniform data record, on the other hand, is stored in the "dynamic" field. Actual user data are stored in the Databank in a structured, predefined manner using the logical fields of the dynamic field. The dynamic field may be implemented on any database engine which supports at least one free-form data field, such as a BLOB or memo field. Even with databases that do not support BLOBs or memo fields, the dynamic field may be implemented using a single large text string field.

In order for the system to correctly interpret the dynamic and static contents, every record type is associated with a corresponding form description (Form Definition) that contains field descriptors and other information relevant to interpreting the dynamic and static contents. The field descriptors thoroughly describe the contents of particular dynamic logical fields and how their contents are to be interpreted. Information stored includes, for example, default values, screen presentation information (e.g., relative size, position, orientation, and the like), field type (e.g., logical, alphanumeric, or the like), pick list information, and "hints" as to how the data should be presented. Thus, the Databank may be viewed as comprising a central Data Repository for storing the actual user data and also comprising a table of descriptors describing how to interpret data in the Data Repository.

Methods are described from reading data from and writing data to the Databank storage mechanism. In a preferred embodiment, the methods are implemented in a fashion so that the client (i.e., software application requiring data storage and processing) is unaware of storage of information in dynamic logical fields. The client simply requests retrieval (or storage) of information, whereupon the system automatically retrieves the information from a conventional database field (if found there at) or a dynamic logical field (if not found at the conventional fields). Thus, the Databank storage subsystem may be implemented in a manner which is transparent to clients and, at the same time, store non-uniform information in a highly efficient manner.

DETAILED DESCRIPTION OF A PREFERRED EMBODIMENT

The following description will focus on the presently preferred embodiment of the present invention, which is operative in an end-user application running under the Microsoft® Windows environment. The present invention, however, is not limited to any particular one application or any particular environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

System Hardware

Figure 1A:
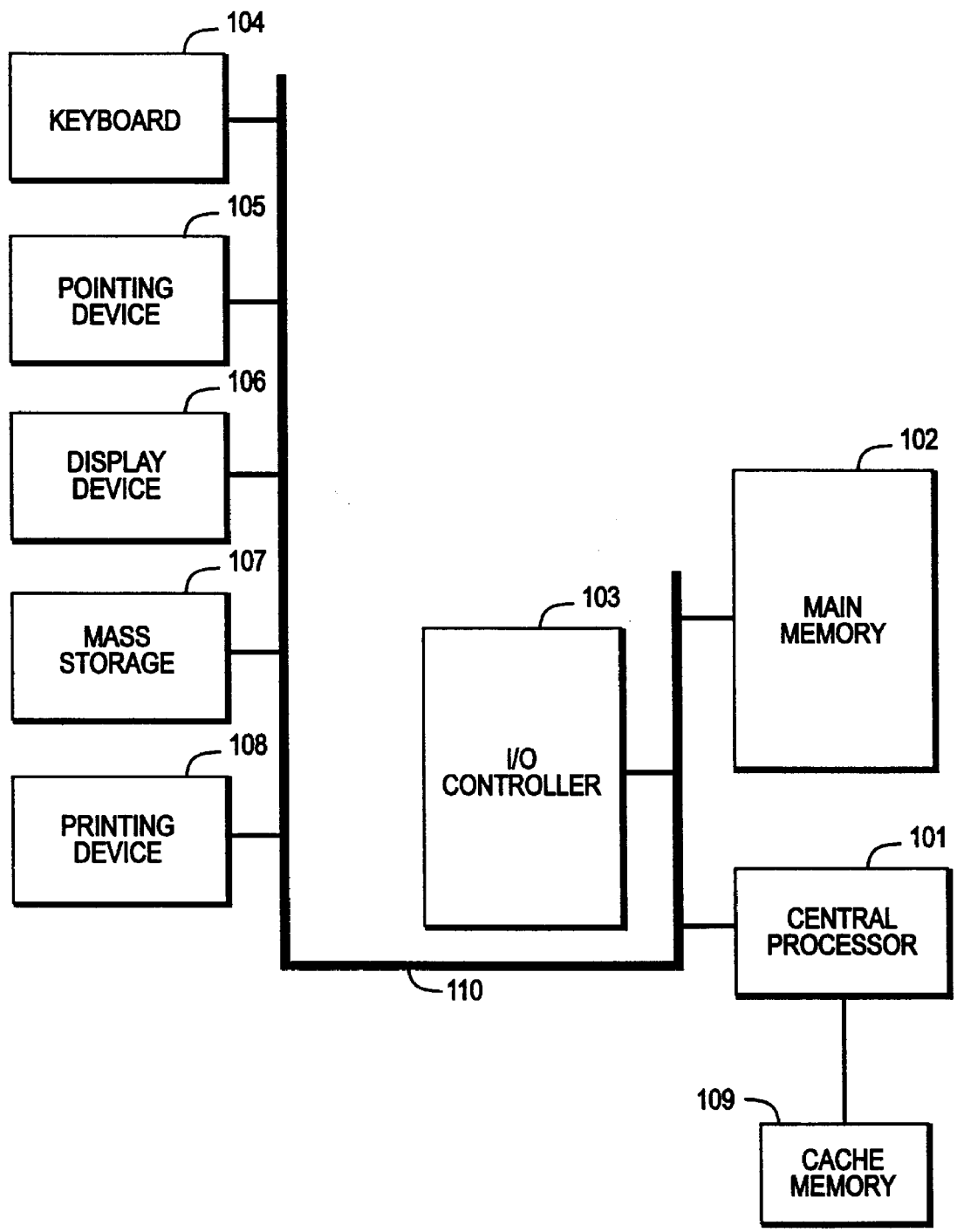
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). Additional input/output devices, such as a printing device 108, may be included in the system 100 as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.).

System Software

A. Overview

Figure 1B:
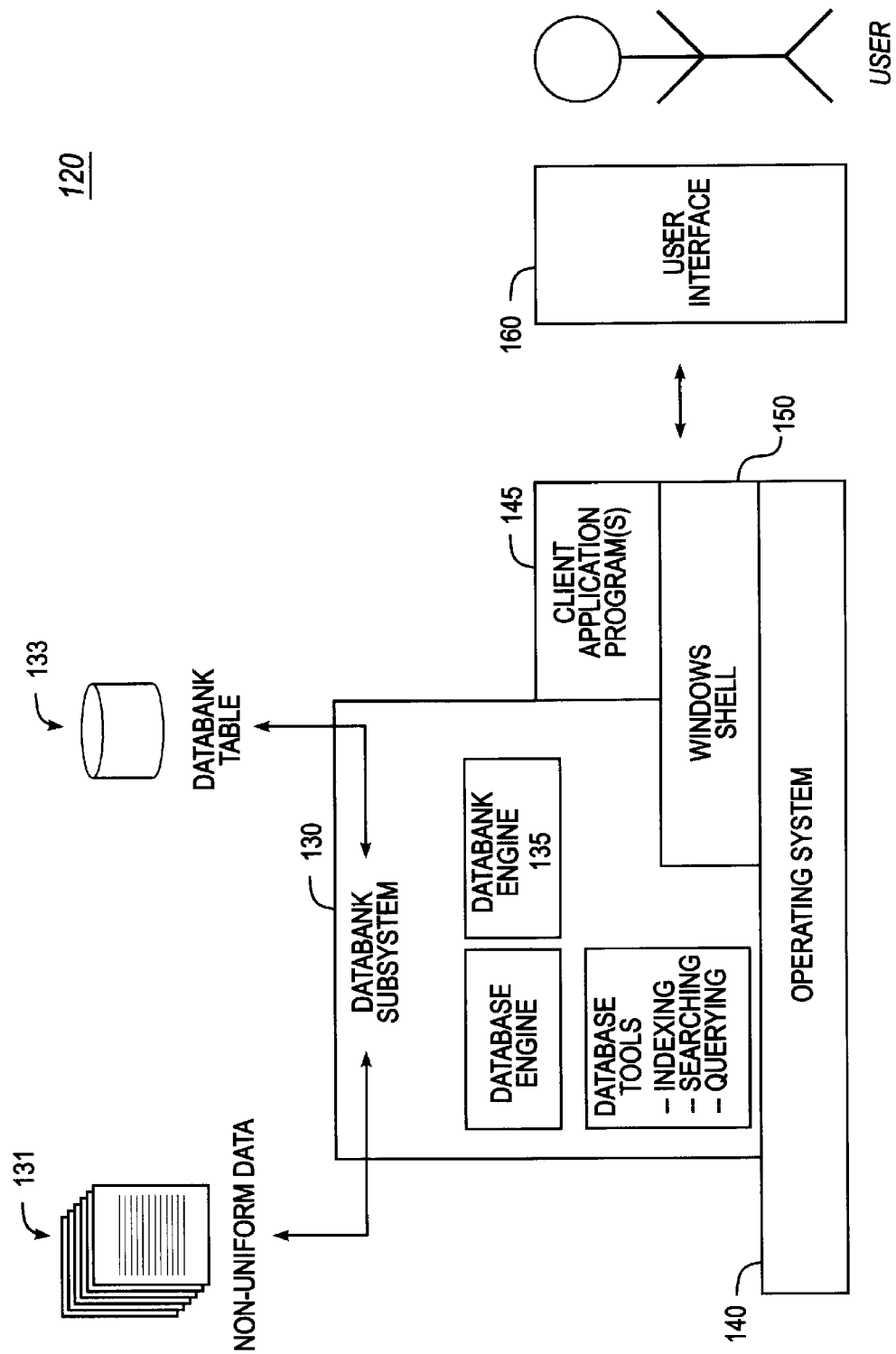
FIG. 1B is a block diagram of a software system of the present invention, which includes a Databank subsystem for the storage of non-uniform data records.

Illustrated in FIG. 1B, a computer software system 120 is provided for directing the operation of the computer system 100. Software system 120, which is stored in system memory 102 and on disk memory 107, includes a kernel or operating system (OS) 140 and a windows shell 150. One or more application programs, such as client application software 145 may be "loaded" (i.e., transferred from storage 107 into memory 102) for execution by the system 100. As shown, at least one windows application software employs a Databank storage subsystem 130 of the present invention, which includes a Databank Engine 135 for storing non-uniform data 131 in a Databank table 133. As will be described below, the Databank storage subsystem 155 provides an improved storage mechanism of the present invention; at the same time, it preserves the full functionality of a traditional database.

System 120 includes a user interface (UI) 160, preferably a Graphical User Interface (GUI), for receiving user commands and data. These inputs, in turn, may be acted upon by the system 100 in accordance with instructions from operating module 140, windows 150, and/or client application module(s) 145. The UI 160 also serves to display the results of operation from the OS 140, windows 150, and application (s) 145, whereupon the user may supply additional inputs or terminate the session. Although shown conceptually as a separate module, the UI is typically provided by interaction of the application modules with the windows shell, both operating under OS 140. In a preferred embodiment, OS 140 is MS-DOS and windows 145 is Microsoft® Windows; both are available from Microsoft Corporation of Redmond, WA. Databank 130 will now be described in further detail.

Databank storage subsystem

A. Overview

The task of storing various "pieces" of information has remained a problem for database designers. Although such information may be "lumped" into a single text field, the ability to further process the data (e.g., performing queries, indexed lookups, and the like) is largely lost, as one must instead resort to brute-force text string searches. If the information is stored in a text file, the functionality of other database tools is lost as well. File locking and other concurrency controls, for instance, are not available.

The Databank of the present invention provides a single, central storage for all user information, including non-uniform data records. According to one embodiment of the present invention, the Databank includes a Databank table comprising a plurality of records having "static" fields and a single "dynamic" field (comprising various logical fields or "subfields"). These are used in conjunction with a Form Definition having field descriptors. Using the Databank approach of the present invention, new types of information (e.g., new styles of records) may be added to the system without restructuring the stored data.

B. Static and Dynamic Fields and Field Descriptors (Form Definition)

The static fields store descriptor information common to all data records and are thus core fields necessary for each of the data records, irrespective of what type of information a given data record stores. The actual data from the non-uniform data record, on the other hand, is stored in the "dynamic" field which functions as the Data Repository. Actual user data are stored in the Databank in a structured, pre-defined manner using the logical fields of the dynamic field. The dynamic field may be implemented on any database engine which supports at least one free-form data field, such as a BLOB or memo field. Even with databases that do not support BLOBs or memo fields, the dynamic field may be implemented using a single large text string field.

In order for the system to correctly interpret the dynamic and static contents, every record type is associated with a corresponding form description (Form Definition) that contains field descriptors and other information relevant to interpreting (e.g., reading, saving, displaying, and the like) the dynamic and static contents. The field descriptors thoroughly describe the contents of particular dynamic logical fields and how their contents are to be interpreted. Information stored includes, for example, default values, screen presentation information (e.g., relative size, position, and orientation), field type (e.g., logical, alphanumeric, or the like), pick list information, and other "hints" as to how the data should be presented. Thus, the Databank may be viewed as comprising a central Data Repository for storing the actual underlying data and also comprising a table of descriptors describing how to interpret data in the Data Repository.

Figure 2:
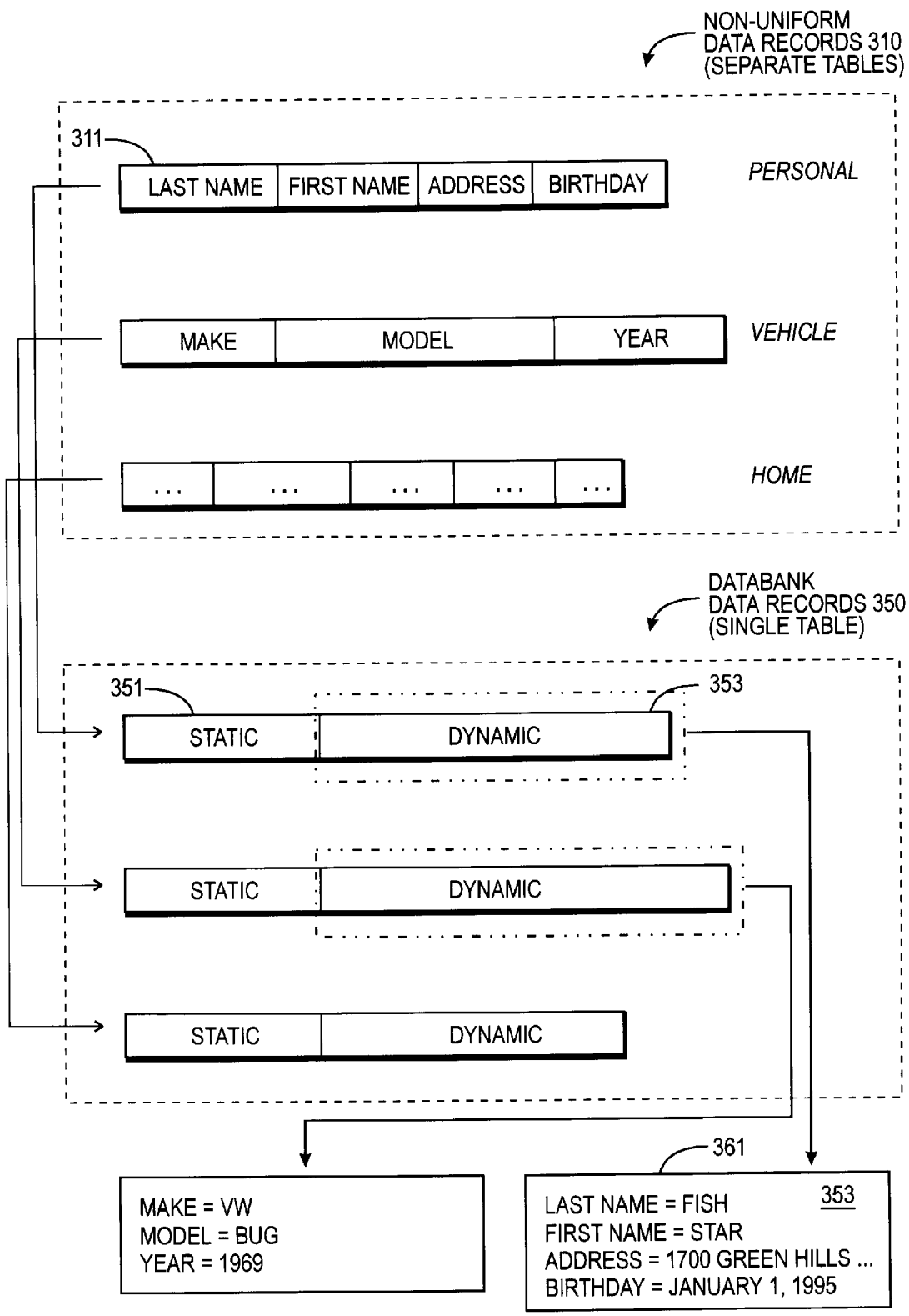
FIG. 2 is a block diagram illustrating the storage of non-uniform data records from separate tables as Databank data records in a single table.

FIG. 2 is a block diagram illustrating this approach for storing non-uniform data. For purposes of clarity, a simple example of storing non-uniform text is demonstrated. As shown, non-uniform data records 210 may include non-similar data, such as personal, vehicle, and home information. Personal data record 211, for instance, may be stored as a Databank record 250, as shown. In particular, the actual user information in the personal data record 211 is stored in a single dynamic field 251. As shown by the enlarged view 261, the dynamic field 251 comprises a text block storing the data members in a structured, contiguous fashion. For the example of FIG. 2, the format is as follows:

[field name]=[actual data][carriage return]

For text, therefore, the format is Field name, followed by "=", followed by actual data, and finally followed by a carriage return character.

C. Generic sort fields (indexing)

Each "Form Definition" allows additional sort criteria to be applied to the data. An exemplary Databank data file includes at least one static field serving as a generic field dedicated to sorting. Multiple indexes may be maintained on the data file, with the meaning of any particular index being interpreted based on what the Form Definition contains (i.e., the sort may be interpreted in the context of a particular form). For a particular data record, for instance, a first index may be interpreted as an index on last name (index1=Last Name) and a second index on company name (index2= Company Name). For the next record, however, index 1 may be by service date (index1=service date) and index 2 may be by vehicle name (index2=vehicle name). In either case, both indexes operate by matching key values, thus correctly indexing a given type of record (despite the fact that the index actually indexes a plurality of different record types). This allows the system to perform lookups and browsing efficiently across diverse data record types, based on the indexes which are all the while being maintained by a traditional database engine.

D. Cross-Reference Records

The data file or Data Repository also includes (optionally) a cross-reference field for storing a cross-reference from one record to another. This functionality is perhaps best explained by example. Consider, for instance, the storage of information specifying a recurrent "To Do," such as a task to be performed weekly, monthly, or the like. Internally, the system maintains a base record defining the recurring "To Do" item. Moreover, however, the system also stores "instance records" for each particular instance of the "To Do" task. An instance record is employed for each instance so that the user may modify a given instance, such as marking it as completed or rescheduling it to a later time. The individual "To Do" stores a cross-reference to the corresponding general "To Do" record.

Consider, for instance, base or master "To Do" record storing:

Desc: English 101

A particular instance of the "To Do" may then store:

Date: Sept. 12, 1996 together with a cross-reference back to the master. A request to retrieve the description (Desc) from the instance record is actually satisfied by referring back to the master record, via the cross-reference. Finally, the instance may store new information for a particular field, such as:

Desc: English 101 Final Exam

Date: Sept. 12, 1996 whereupon, a request to retrieve the description (Desc) from the instance record is actually satisfied by the instance itself. There is no need to refer back to the master record.

E. Combining Similar Records

Figure 3:
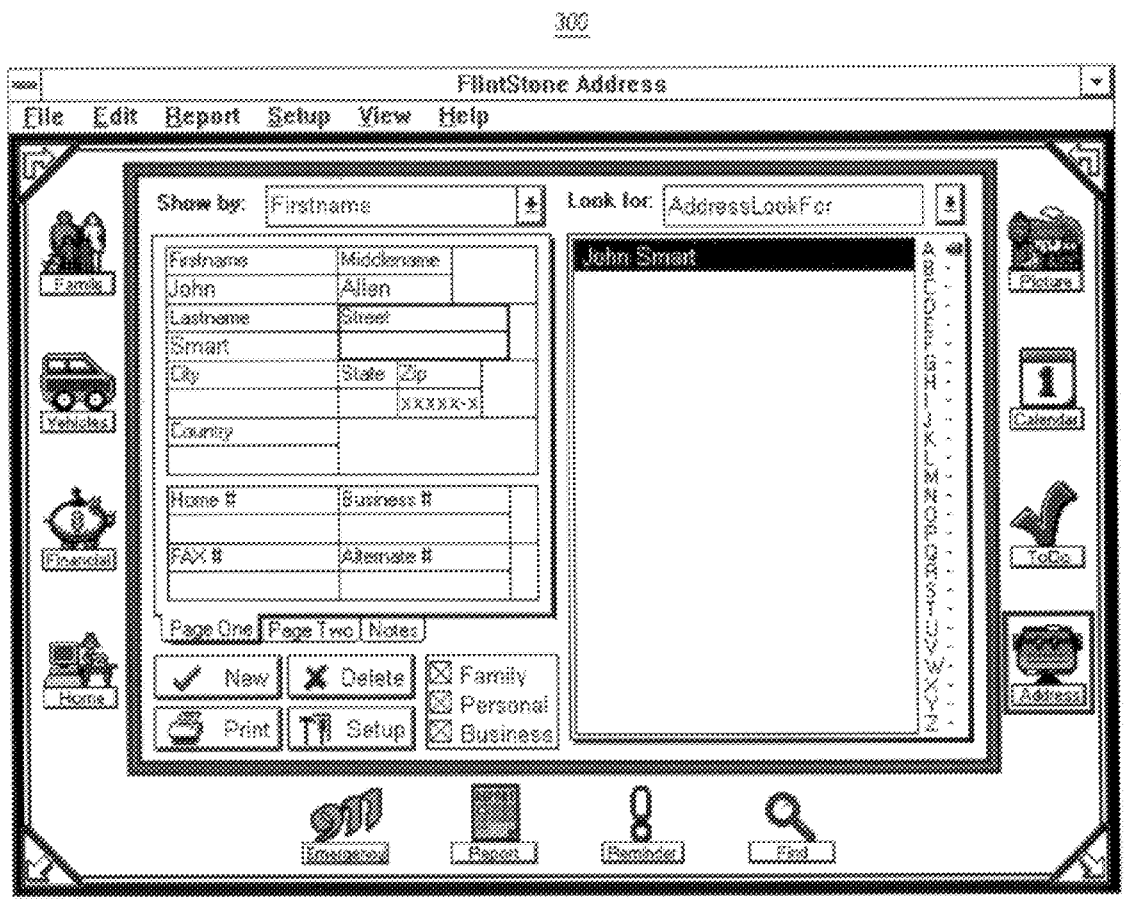
FIG. 3 is a bit map screen shot illustrating an Address Manager in the system of the present invention, which allows a user to store family addresses, personal addresses, and business addresses.

Referring to FIG. 3, combination of similar types of records will now be illustrated. "Similar records" are ones which have some characteristic in common, but which are not efficiently stored using traditional database storage methodology. FIG. 3 illustrates an Address Manager 300 in the system of the present invention; it allows the user to store family addresses, personal addresses, and business addresses. The address types have information in common, such as street names and telephone numbers. They are, nevertheless, different. Family and personal addresses store, for example, birthday information, while business address does not. Business address, on the other hand, stores a business name and title, while family and personal address do not. Family address stores relationships, while personal and business do not. Although there are differences among the address types, they are to a large extent the same.

The system of the present invention allows the combination of three different forms but still uses the same display. Thus when the user creates a new address, he or she may create a particular type. Depending on which type is chosen, the system displays the address with a slightly changed form. The indexes employed to track the various types of addresses can nevertheless be maintained for similar information. For example, index on Last Name applies for all records, despite the fact that where the Last Name field appears in any address type varies from one address record type to another. Information which is not similar, such as a business name, can still be indexed. For those record types for which the index information would make no sense, the index simply stores an empty string (i.e., index on business name stores an empty string for a personal address record). Thus not only can the database approach be applied to non-similar information, but the approach can also be advantageously applied to similar, but different, information.

In an exemplary embodiment, the indexes are maintained on the first four "logical fields" stored in the dynamic field. This is achieved through aliasing. In the form definition, for example, Last Name is aliased into index1, First Name is aliased into index2, and the like. For the business address, the corresponding form definition (descriptor) aliases Business Name into index3; the other two form definitions (i.e., for family and personal) do not contain an alias definition for the third index (i.e., it is treated as an empty index). In this fashion, indexes can be re-used based on the Form Definition. Moreover, the user can perform lookups across different record types, so long as there is some commonality, such as last name, which would form the basis for the lookup.

F. Use of Form Hints

Figure 4:
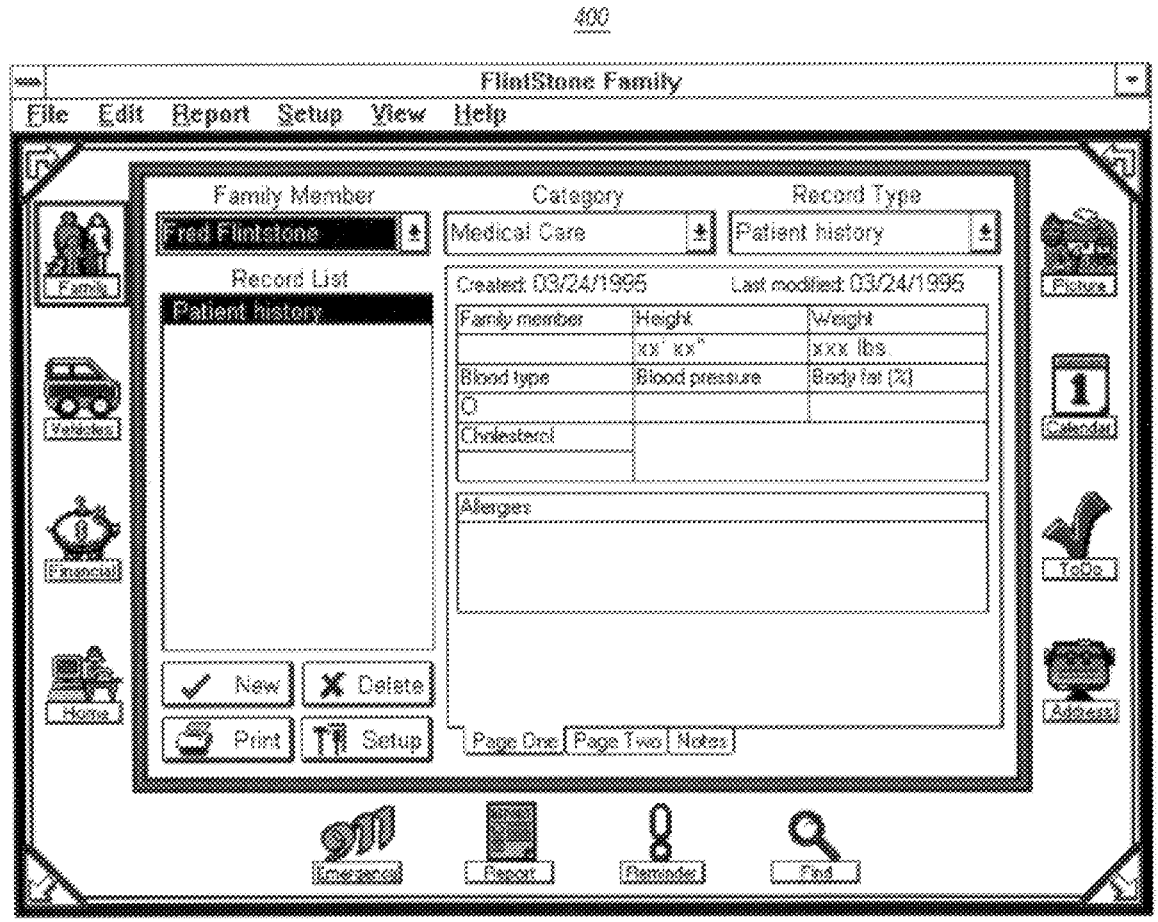
FIG. 4 is a block diagram illustrating a Family Page in the system of the present invention, which employs hints stored in the Form Description (accompanying the Databank fields) to build the actual form on screen.

Instead of hand-designing each form for a given record type, the system employs the hints stored by the Form Definition to build the actual form on screen. This is illustrated by the Family Page 400, shown in FIG. 4. As illustrated for family member Fred Flintstone, the category is medical care and the record type is patient history. Each category has a set of record types, which correspond to form names. The medical category, for instance, includes record types of patient history, family history, hospitalizations, doctor visits, and the like. These are different pieces of information, yet they contain a core part which is identical.

Recall that the Form Definition stores information describing the contents of the dynamic field—what are the (user) data fields of a particular record. Since the field descriptors completely characterize the user data, they may be employed to construct on-the-fly a visible form on screen, for displaying the corresponding user data. For a Last Name field, for example, in addition to storing that the field comprises alphanumeric information, the Form Definition also store desired display characteristics of the user data. Thus, for instance, the Last Name field may also have associated with it a descriptor specifying minimum and maximum lengths that the field may be rendered on screen, as well as orientation information and relative location (i.e., relative to other fields). For instance, a Last Name may include a hint specifying that it is to be displayed before (i.e., above) an Address field, displayed to the left of a First Name field, displayed with a separator (i.e., separating line), displayed as part of a group (i.e., personal information group), or the like.

According to the present invention, since there are so many different types of information to be modeled, it is preferable to not store forms for rendering the user data (as is conventionally done). Even without a particular form having been designed for the data (such as a car service form having been designed for car service data), the system may render the data on screen with optimal formatting, using the hints. Using the field descriptors, the system may employ a generic engine for rendering data on screen in a variety of forms created on-the-fly, at run time. For instance, a separator may be displayed between the address portion and phone number portion of the record rendered on screen. The hints for the address field in this instance stores a hint specifying that a certain amount of space is to be left on screen after rendering the address information. At the same time, however, it is not known beforehand exactly what information is to be rendered after the address field. The hints for any particular user-data field of the dynamic field includes a list of features that are desired for the data (not only to itself but relative to other fields) when it is rendered among a group of other user-data fields (which may not be known beforehand). This allows the system the flexibility to render a set of user data on screen (e.g., given a particular size and location in which it must be rendered) by using the hints to determine on-the-fly how individual fields of the user data are to be displayed.

G. Browsing using generic indexes

The system of the present invention provides single browser, implemented as a "Find" option, for browsing across different types of information in a single setting and single context. In particular, Find employs a generic index on the various record types, such as an index on who the record "belongs to." In a preferred embodiment, the generic fields of the Databank include fields storing information about a particular user (e.g., family member), particular form (e.g., doctor visit), date created, date modified, and the like. Using Find, the user can easily browse with a single browser across the different data records for a given user, or for a given form, or for a given date, or the like.

Figure 5A:
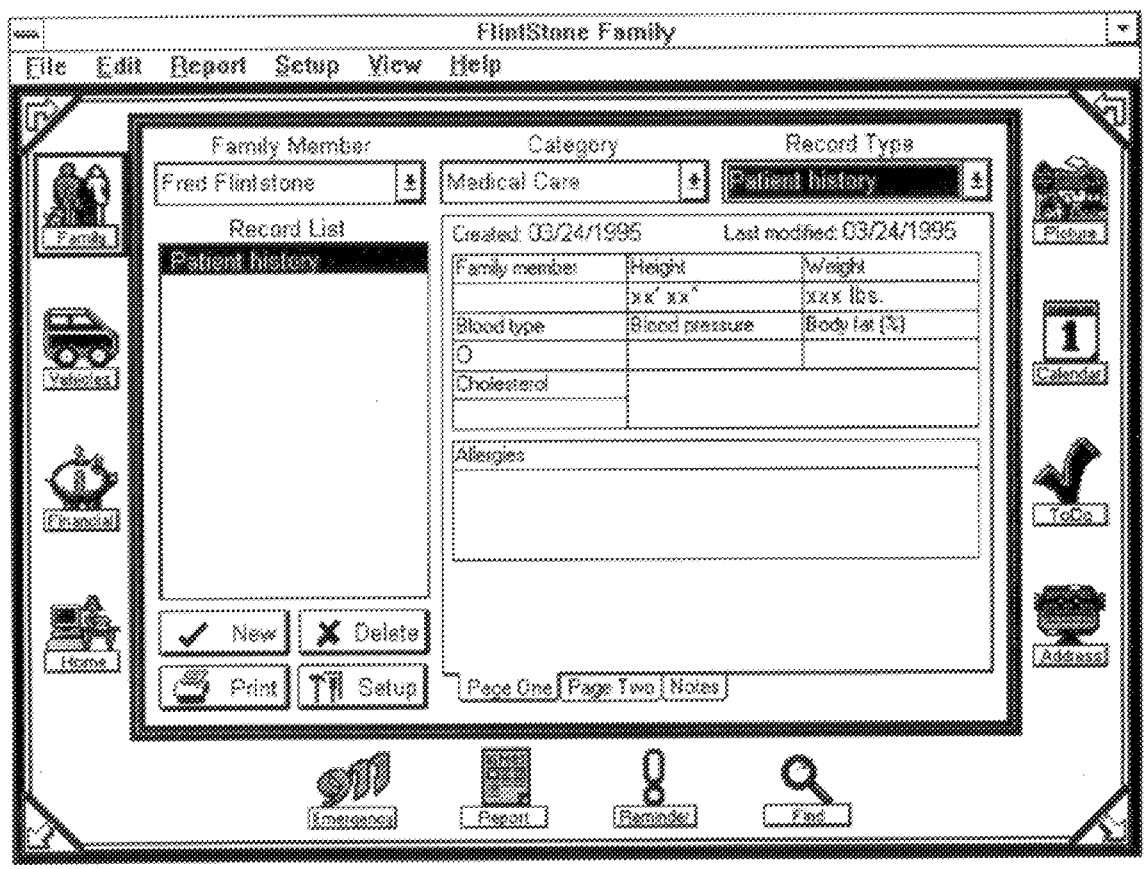
FIGS. 5A–E are bit map screen shots illustrating use of a single browser in the system of the present invention to find information in any data record, regardless of its particular "record type."
Figure 5B:
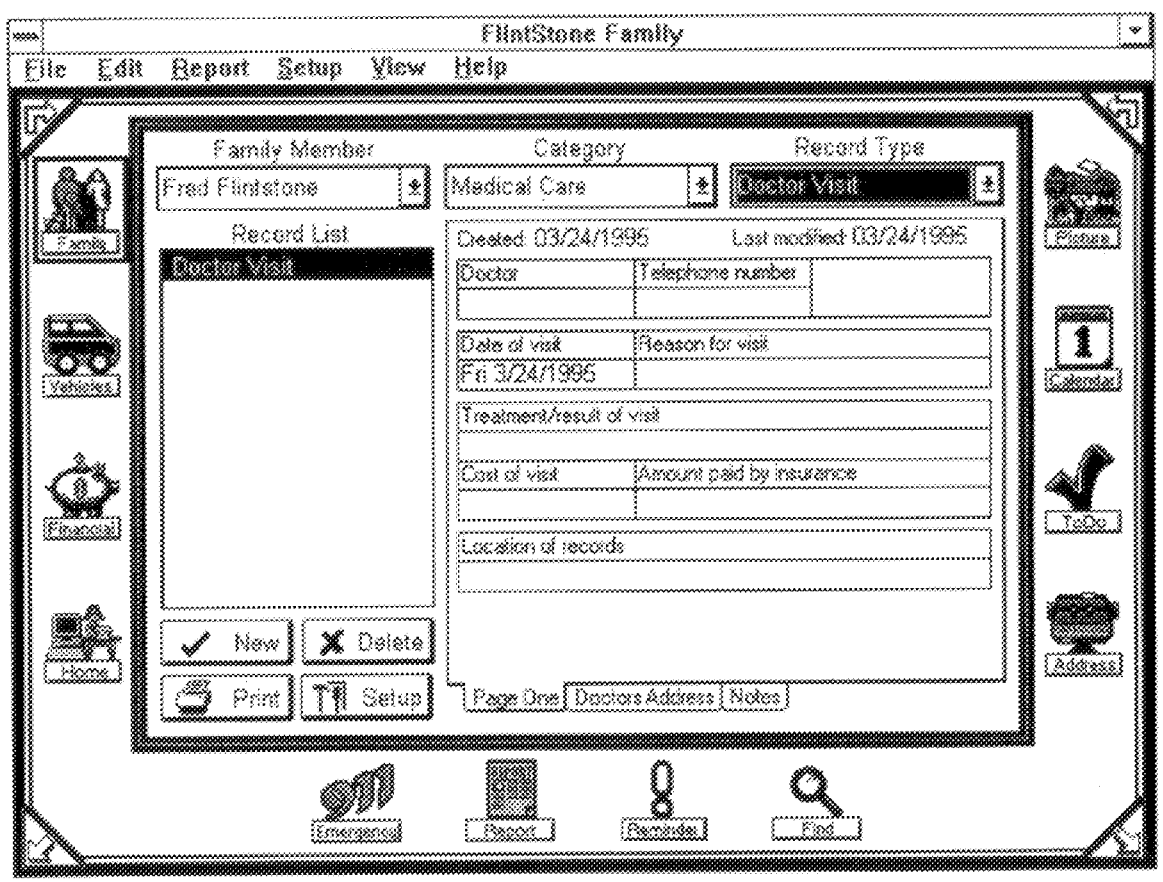
Figure 5C:
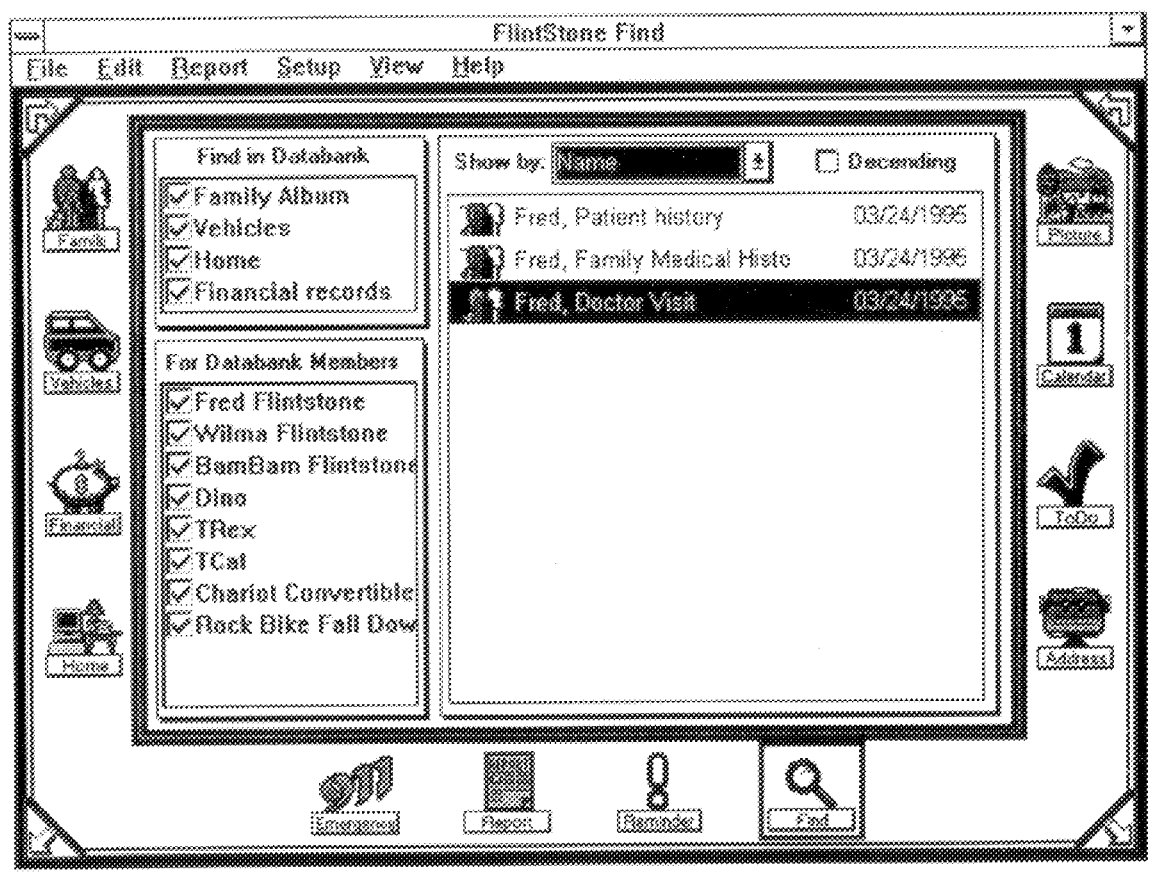
Figure 5D:
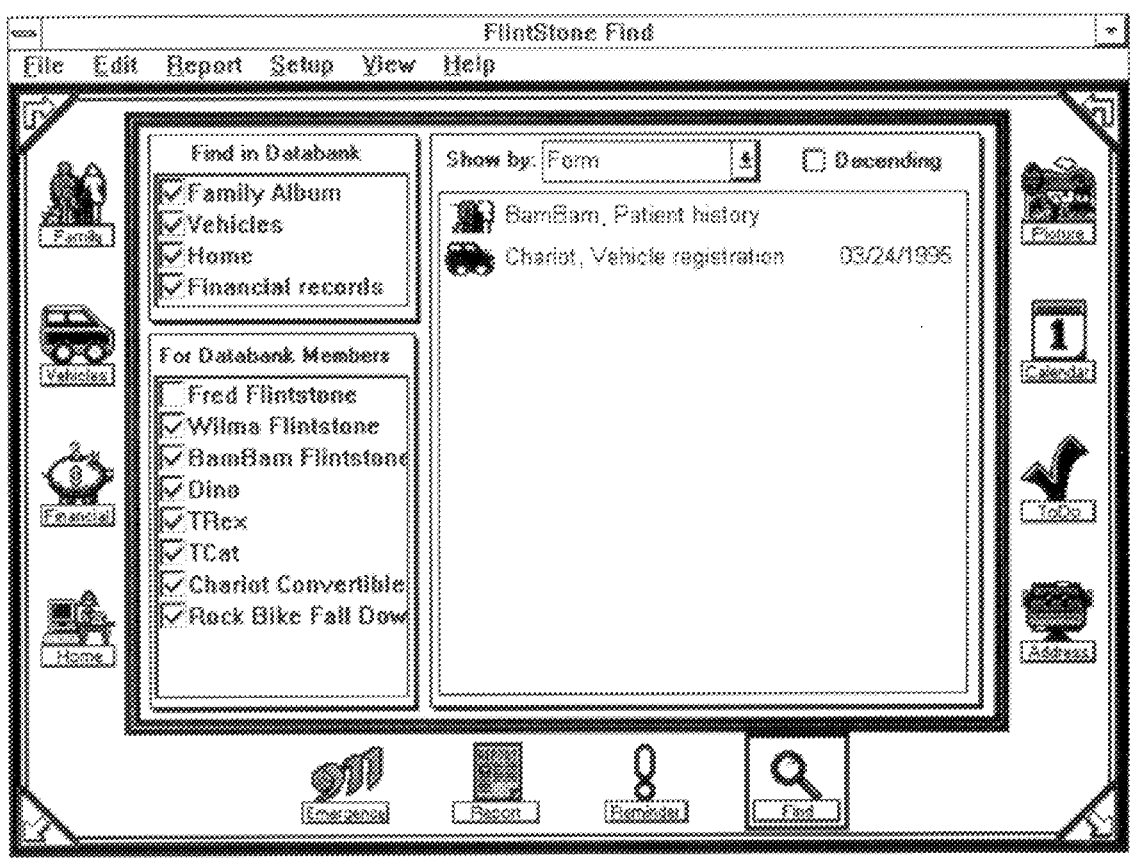
Figure 5E:
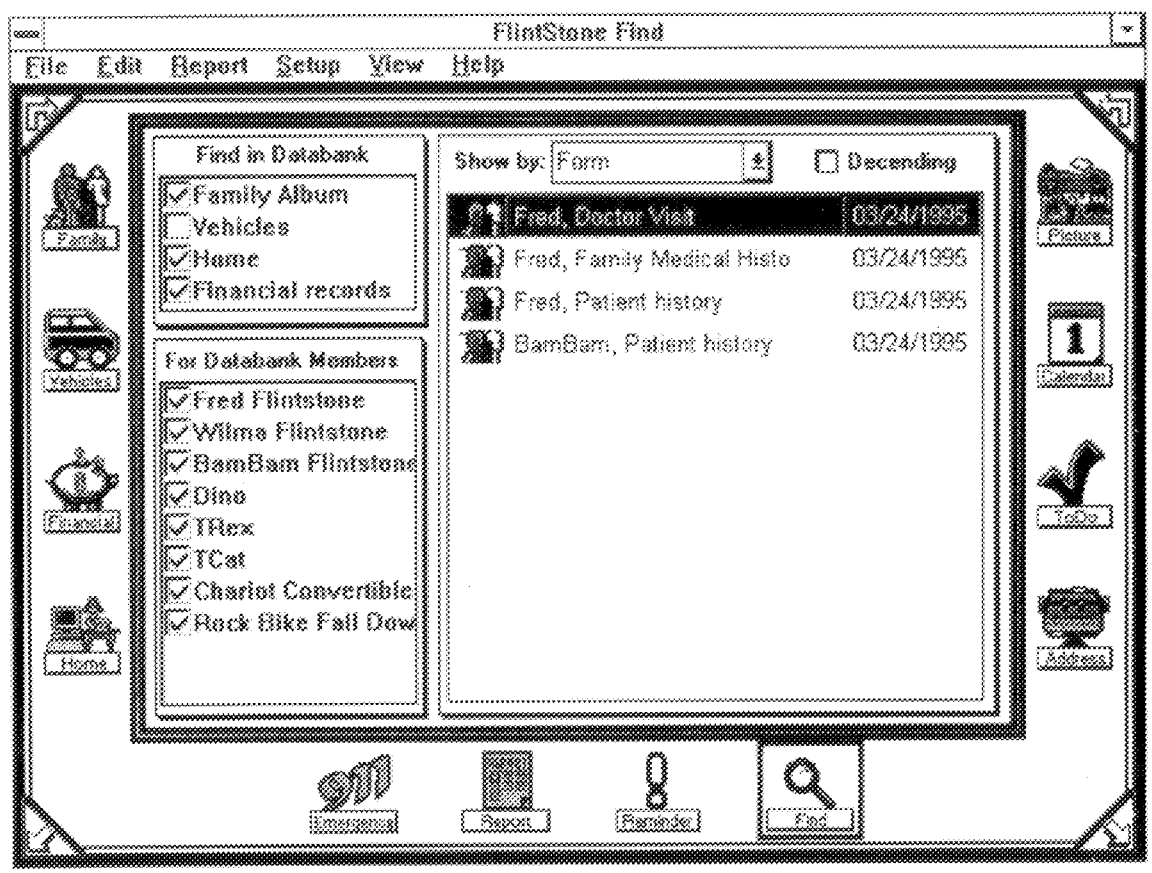

FIG. 5A–E illustrates browsing of different data record types using the single browser. FIG. 5A shows patient history, which has a certain form. FIG. 5B, on the other hand, shows a form for doctor visit. As illustrated in FIG. 5C, the user can use a single browser to find information in any record in the system, regardless of its particular "record type." In this case, all records pertaining to Fred regardless of type are displayed. Further, conventional filtering techniques may be applied. For instance, the records could be filtered to not show Fred Flintstone, as illustrated in FIG. 5D. Or, alternatively, the records could be filtered to not show a particular record type, such as not showing vehicle registration records, as illustrated in FIG. 5E. By using generic indexes, therefore, a single browser may be employed for browsing different record types. This allows several generic operations to be performed on the data, even though the data content itself may be non-uniform.

H. Query Optimization

The Databank may be used for query optimization. Consider, for example, the task of searching for various records having Last Name=Freund. To answer such a query, the system may first look at the field descriptors for determining those record types which include a field of "last name" (i.e., have a dynamic field which stores last name information). Next, the system may set a filter, for filtering out all records in the Databank which do not have a last name field. This filtering step may be done in a convention manner, such as using bitmask filters as described by Fulton et al. in International Application No. PCT/US91/07260, International Publication No. WO 92/06440, Apr. 16, 1992. After filtering out the irrelevant records, the system may then proceed to satisfy the query by processing the information stored in the dynamic field, such as by using the above-described index lookup. The reader should note that since the storage mechanism is generic, the Databank engine itself is also generic and thus may be easily adapted to a variety of applications and their data. This is one example of how the generic approach of the present invention may be applied for processing information which, on the other hand, is diverse.

I. Adapting to new data types on the fly

Although the Databank system of the present invention has been illustrated in terms of database management of a plurality of diverse data records, the invention may also be advantageously applied to storage and management of more conventional information. Regardless of information to be modeled, almost every database design includes fields which are used rarely. Consider, for instance, a retail organization whose sales are almost entirely cash based but, nevertheless, must handle credit card sales from time to time. To accommodate the occasional credit card sales, the traditional approach would be to add an additional field=a credit card field=to the underlying sales transaction table (e.g., Sales table). Not only is this wasteful of storage space (as the allocated space is rarely used), but more importantly the overhead associated with adding a rarely-used field degrades system performance. This overhead is carried forward throughout several database operations, such as during execution of queries. Thus, in addition to the need for managing a plurality of diverse data records, there is also a need to accommodate rarely-used information which nevertheless cannot be eliminated from the system.

The foregoing example assumes, for simplicity, that the information to be modeled is in fact known beforehand—while the database tables are being created. More often, however, there is no such "perfect knowledge" of the exact data which eventually is required to be modeled. Suppose in the foregoing example, for instance, that the business decides to also offer COD as a payment option. Since this option was not accommodated in the original design, the sales transaction table must be restructured—a major undertaking.

The Databank system of the present invention handily solves both of these problems. Being a generic storage mechanism, the Databank of the present invention readily accommodates new data records of different types, yet does not require a restructuring of the underlying table. In the instance of the first example (i.e., occasional credit card sales), the system simply stores most of the data records as cash-based records, with no storage allocation for credit card sales. When the few instances of credit card sales arise, credit card records are simply added to the Databank. This may be done in a generic manner by simply adding a descriptor (to the pre-existing static fields) for describing this new data type. Moreover, this may be performed at run time (i.e., on-the-fly) in a manner which is transparent to the client.

For the second example (i.e., adding COD sales), the Databank eliminates the need for restructuring the sales transaction table. Instead, the COD sales transaction record is simply added to the Databank in a generic manner—that is, adding a new descriptor (to the static fields) followed by simply storing the data for this new record type in a dynamic field.

Internal Operation

Figure 6A:
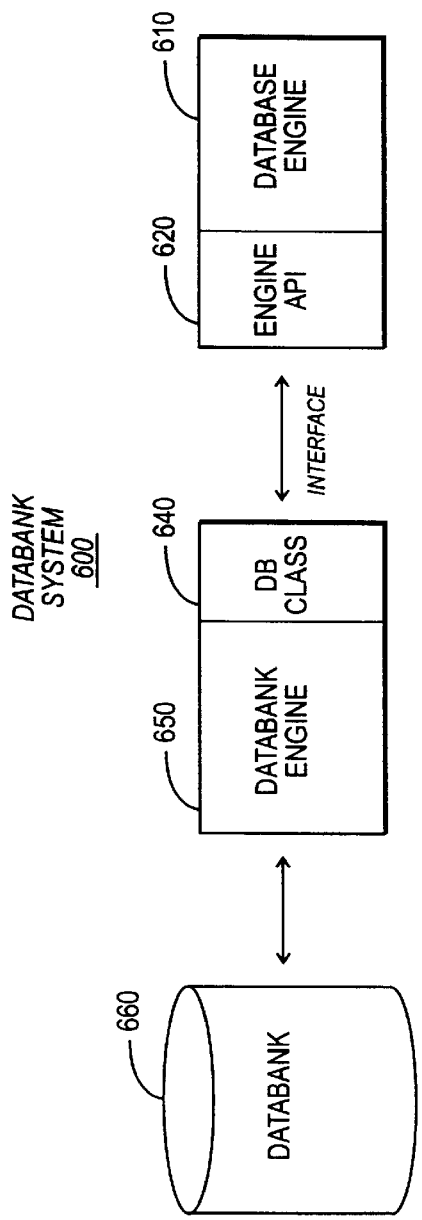
FIG. 6A is a block diagram illustrating the functional modules of a Databank system constructed in accordance with the present invention.
Figure 6B:
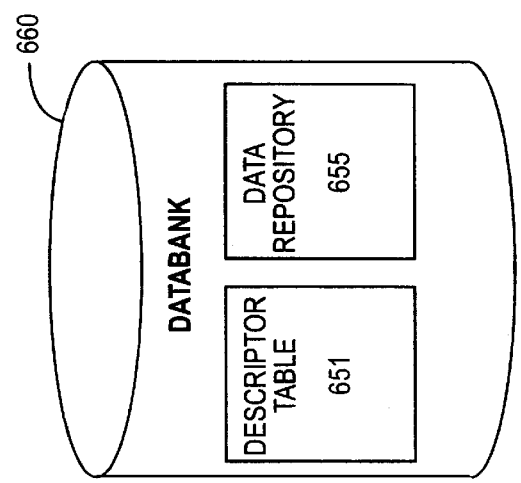
FIG. 6B is a block diagram illustrating the Databank storage module, which includes a Descriptor Table ("Form Definition") and a Data Repository.

FIG. 6A is a block diagram providing an overview of the functional modules of a Databank system 600, constructed in accordance with the present invention. As shown, the Databank system 600 comprises a Database Engine 610, a Database Engine API (Application Programming Interface) 620, a Databank engine 650, a Databank Engine Class Interface 640, and a Databank (storage) 660. FIG. 6B illustrates that the Databank 660 in turn comprises the aforementioned Descriptor Table (shown at 651) and Data Repository (shown at 655). The components will be described in further detail.

A. Database Engine (configured for DataBank operation)

The Database Engine 610 is a conventional (e.g., relational) database engine that controls the organization, storage, and retrieval of information from a database. A database is an organized collection of related information or data stored for easy, efficient use. An address book is a database, as is the card catalog in a library, a company's general ledger, and a completed tax form. Thus, a database is a collection of one or more tables used to keep track of information.

Conceptually, a table is organized (logically) into horizontal rows (tuples) and vertical columns, thus making it easy for a user to examine or change data. Each row or "record" contains all available information about a particular item, such as storing information about an individual person, place, or thing (depending on what the table tracks). A record for an employee, for instance, may include information about the employee's ID Number, Last Name and First Initial, Position, Date Hired, Social Security Number, and Salary. Thus, a typical record includes several categories of information, that is, each record in the table is made up of several categories of information about one specific thing.

Although a database record includes information which is most conveniently represented as a single unit, the record itself includes one or more columns or categories of information. A vertical column contains one category of the data or "field" that makes up a record. Each field contains one category of information about the person, place, or thing described in the record. In the employee table, categories include ID Number, Last Name and First Initial, Position, Date Hired, Social Security Number, Salary, and so on. Internally, tables may be stored by the system as a sequence of fixed-length or variable-length binary records in a single disk file. The system uses a record number as an internal counter to keep track of each record.

Each field has a field type specifying what sort of information the field can hold and what actions can be performed with that field's data. The system categorizes fields into several types. Each field's type determines the kind of data it contains. Some common field types include alphanumeric (or character), number, date, currency, and memo. Tables may also support binary large objects fields, which hold specialized information, such as formatted memos, graphic images, and OLE links.

By employing one or more database indexes, the records of a table can be organized in many different ways, depending on a particular user's needs. When a user requests an index, the system creates a file that contains the indexed field's values and their corresponding locations. The system refers to the index file when locating and displaying the records in a table, thus affording quick retrieval of the information sought. Although one can use an index to view the records in a different order from the default order, the records themselves remain stored in the same physical location as they were entered.

In a preferred embodiment, the system may store for each data table one or more indexes. An index generally stores two types of information: index key values and unique record numbers. An index key is a data quantity composed of one or more fields from a record; keys are used to arrange (logically) the database file records by some desired order (index expression). Record numbers, on the other hand, are unique pointers to the actual storage location of each record in the database file. In this manner, an index for a database file is similar to the index of a book, which lists subject keys and page numbers that point to where the actual information is located in the book. Specifically, an index organizes (logically not physically) the records in a database file according to the values in one or more fields of interest. Because information about records may be determined without examining the underlying records themselves, the index may greatly speed up searching (querying) for and sorting of information.

An index file itself may be organized as an ordered tree structure, such as a conventional B-tree structure. General techniques for the construction and operation of B-tree index files are well documented in the technical, trade, and patent literature. For a general description, see Sedgewick, R., Algorithms in C, Addison-Wesley, 1990. For a description of B-tree indices implemented in a PC DBMS system, see Baker, M., B-tree indexing: A look at indexing tradeoffs in dBASE, Clipper, and FoxPro, Programmer's Journal, Vol. 8.6, November/December 1990, pp. 42–46. Also, see SYSTEM AND METHODS FOR INFORMATION RETRIEVAL, International Application No. PCT/US91/07260, International Publication No. WO 92/06440, Apr. 16, 1992, which describes B-tree index for Fox® PC DBMS software. Multiple index files, including dBASE's .mdx files, have also been described in the technical literature; see e.g., Freeland, R., Exploring MDXs, Data Based Advisor, February 1991, pp. 85–87. The disclosures of each of the foregoing references are hereby incorporated by reference.

The static and dynamic fields of the Databank itself may be implemented as a dBASE database file (with accompanying freeform (memo) file), with the following record structure:

| Name | Type | Length | Comment |
|---|---|---|---|
| NAME | Char | 40 | Name of the owner of the record. |
| TITLE | Char | 40 | Title of the record. This title is defined in the form and can be either a constant for example "Dental History" or calculated from other fields. The title determines the text in a pick list for this record. |
| CLASS | Char | 20 | This field determines what group of forms the record belongs to, for example "Dental Records". It is only used in the albums (Family, Vehicle, and the like). |
| FORM | Char | 20 | This is the name of the form that defines the dynamic part of the record, for example "Dental History". |
| ALBUM | Char | 1 | This single character field determines to which module of the system the record belongs. This can be either one of the albums or address, multi-day events etc.<br>System-wide constants are defined in the module HBMAIN:<br>　cFamily = 'F'; {Family album}<br>　cVehicle = 'V'; {Vehicle album}<br>　cFinance = '$'; {Finance album}<br>　cAssets = 'A'; {Home album}<br>　cAddress = '@'; {Address book}<br>　cToDo = 'T'; {ToDo list}<br>　cMultiDay = 'M'; {Multidate list}<br>　cSetup = 'S'; {Setup info}<br>　cAll = ' '; {Generic} |
| CATEGORY | Char | 4 | This field is used to allow efficient filter mechanisms within a module and its meaning is determined by the specific module. It also is used to determine the primary order of the records (together with title}. |
| CREATED | Char | 8 | Date when record was created |
| DBDATA | Memo | 10 | This memo field contains the dynamic part of the record. Its contents are determined by the form. The data has the structure<br>　<Dynamic Fieldname> = <String><br>For example:<br>　Lastname = Flintstone<br>　Firstname = Fred<br>　Birthday = 09/12/1959<br>Only fields whose value doesn't match the default will be saved here, the complete structure of the record is in the forms definition.<br>Unlike regular fields these field can contain any characters except for "=" and are case sensitive. |

-continued

| Name | Type | Length | Comment |
|------|------|--------|---------|
| NOTES | Memo | 10 | This field contains user notes attached to the record. |

Accordingly, the static fields may be constructed as follows (shown as an array of TField in Object Pascal):

```
DBankFldList: array [0..DBankFldCount] of TField =
((name: 'NAME';       atype: dtStr;    len: 40; dec:0),
 (name:. 'TITLE';     atype: dtStr;    len: 40; dec:0),
 (name: 'CLASS';      atype: dtStr;    len: 20; dec:0),
 (name: 'FORM';       atype: dtStr;    len: 20; dec:0),
 (name: 'ALBUM';      atype: dtStr;    len:  1; dec:0),
 (name: 'DONE';       atype: dtStr;    len:  1; dec:0),
 (name: 'CROSSREF';   atype: dtNum;    len:  6; dec:0),
 (name: 'DATETIME';   atype: dtStr;    len: 12; dec:0),
 (name: 'TIME';       atype: dtStr;    len:  4; dec:0),
 (name: 'CATEGORY';   atype: dtStr;    len:  4; dec:0),
 (name: 'CREATED';    atype: dtDate;   len:  8; dec:0),
 (name: 'CHANGED';    atype: dtDate;   len:  8; dec:0),
 (name: 'DBANKDAT';   atype: dtMemo;   len: 10; dec:0),
 (name: 'NOTES';      atype: dtMemo;   len: 10; dec:0),
 (name: nil;          atype: dtNull;   len:  0; dec:0));
```

Each will be described in turn.

Name is the name of the "owner" of the record. In the exemplary embodiment for tracking home information, for instance, Name stores the person (e.g., Fred Flintstone) who the record belongs to. Title is the particular title defined by the form where the data appears. In an Address Form, for instance, Title is Last Name plus First Name, as this is how the title is defined for the form; this "title" is, in turn, stored in the Title field as a string. During system operation, the title is employed in pick lists, for allowing the user to easily select a new form (based on the data contained therein). Accordingly, the system can provide the user with easy navigation among forms, all without the user having to look up particular form data.

Class stores information allowing for subcategories, defined within certain areas in the system. For example, a class of a business address is a "Doctor." Form is the name of the form. It defines the context of the information. Album defines broader categories of information, such as vehicle, address, to do, calendar, and the like. Thus, Albums represent overall categories in the system. Done is a housekeeping field, used in To Do management. Crossref stores any cross-reference to a parent or related record, as previously described.

Datetime and Time store date/time and time stamps, respectively. Storing these in the static fields is particularly useful for To Do and calendar entries, which generally will always store date and time information. As an optimization, the system stores this information in static fields so that it is readily accessible (without having to retrieve it from a dynamic logical field).

Category stores a sequence of characters for specifying an index order for a given data record. Generally, the main index is by Title. Category allows a form in the system to change the ordering of displayed records to a new ordering (as specified by the category). In an Address Manager, for instance, the user may request that all records first be ordered by Title (e.g., Doctor) and then by Name. In this manner, Category allows the system to easily track additional sort criteria specified by the user (i.e., in addition to the default sort order by title).

Created stores the date the record is created; it is used for internal housekeeping purposes. This is followed by Form-data which contains the dynamic field storing the actual user data. This is followed by a Memo field, which stores a memo or note which the user has specified during system operation (i.e., a note which the user may attach to a particular data record).

The data files use compressed FoxPro indexes in a single file, with the following index tags defined:

| Tag Name | Expression |
|----------|-----------|
| NAME | NAME |
| TITLE | CATEGORY + TITLE |
| FORM | FORM |
| CREATED | CREATED |
| CHANGED | CHANGED |

This may be specified via an array of TTag (shown in Object Pascal):

```
DBankTagList: array [0..DBankTagCount] of TTag =
((name:        'NAME';
  expression:  'NAME';
  filter:      nil;
  unique:      dtNotUnique;
  descending:  dtAscending),
 (name:        'TITLE';
  expression:  'CATEGORY + TITLE';
  filter:      nil;
  unique:      dtNotUnique;
  descending:  dtAscending),
 (name:        'FORM';
  expression:  'FORM';
  filter:      nil;
  unique:      dtNotUnique;
  descending:  dtAscending),
 (name:        'CREATED';
  expression:  'CREATED';
  filter:      nil;
  unique:      dtNotUnique;
  descending:  dtAscending),
 (name:        'CHANGED';
  expression:  'CHANGED';
  filter:      nil;
  unique:      dtNotUnique;
  descending:  dtAscending),
 (name:        'ALBUM';
  expression:  'ALBUM';
  filter:      nil;
  unique:      dtNotUnique;
  descending:  dtAscending),
 (name:        'CROSSREF';
  expression:  'CROSSREF';
  filter:      nil;
  unique:      dtNotUnique;
  descending:  dtAscending),
 (name:        'DATETIME';
  expression:  'DATETIME';
  filter:      nil;
  unique:      dtNotUnique;
  descending:  dtAscending),
 (name:        nil;
  expression:  nil;
  filter:      nil;
  unique:      dtNull;
  descending:  dtNull));
```

The Descriptor Table (Form Definitions) contains the definitions for all forms and form lists used by the system. It may be implemented as a simple table, such as by using the standard Windows .INI file format (fully described in the Microsoft Windows Software Development Kit, available from Microsoft of Redmond, WA). In an exemplary embodiment, the format for lists (such as ClassList, FormList, and the like) is

```
[<List name>]
001 = <1st list entry>
002 = <2nd list entry>
003 = <3rd list entry>
...
00n = <nth list entry>
```

For example, an exemplary list of "Family Album" may be constructed as:

```
[Family]
001 = Dental Care
002 = Family History
003 = Home Services
004 = Important Contacts
005 = Medical Care
006 = Medical Providers
007 = Personal Information
008 = Personal Papers
009 = Pet Information
010 = Professional Advisors
011 = Vision Care
```

The name of the list entry also is used to reference other lists or forms; for example "Family History" points to another list of forms relating to that subject:

```
[Family History]
001 = Ancestors
002 = Deceased family
003 = Extended family
004 = Immediate family
```

An exemplary format for forms (shown in Windows'.INI form) may be constructed as:

```
[<Form name>]
001 = <1st field description>
002 = <2nd field description>
003 = <3rd field description>
...
00n = <nth field description>
```

Here, a <field description> is a string of comma separated fields:

| Index | Name | Comment |
|---|---|---|
| 1. | Field name [FName] | Name of the field as it appears in the form. In addition there are several pre-defined "Field names that have special meaning for the system: <br> $T: Definition of Title for this form. A title can be a list of fields and constants seperated by a "/" character. For example: <br>　　001 = $T, Lastname/Firstname <br> $P: Insert a new page in form. This is followed by an optional page name: <br>　　005 = $P, My New Page <br> $L: Start the next field at the left margin of the form ("NewLine") <br> $S: Start the next field in a new section <br> $F: Call a subform and after inserting the fields of the subform return to the next line. Also works in lists. <br>　　006 = $F, SubForm |
| 1. | Field type [FType] | Data type of field. Currently defined are: <br>　C: Generic character <br>　CL: Char list <br>　CR: Char radiobutton <br>　CC: Char combo box |
| 1. | Minimum Width [FMin] | Minimum width in pixel |
| 1. | Maximum Width [FMax] | Maximum width in pixel |
| 1. | Character Width [FChr] | Character width for text entry |
| 1. | Picture [FPict] | Template for editing |
| 1. | Default [FDefault] | Default data value |
| 1. | List [FList] | Pick list for radio buttons, combo boxes etc. separated by a "/" character. |
| 1. | Alias name [FAlias] | Name for field to allow shorter field names and avoid potential conflicts with predefined fields in the databank |

Except for "Field name," all entries are optional. For example the form "ToDo" might look like this:

```
[ToDo]
001 = $P,Description
002 = Description,C,100,150,40,,
003 = $L
004 = Priority,CL,100,200,20,,Normal,Urgent/Medium/Normal
005 = Due date,C,50,100,10,,
006 = $P, Options
007 = Mark as done on due date,CR,80,80,3,,No,Yes/No
008 = Archive when done,CR,80,80,3,,No,Yes/No
009 = $L
010 = Recurring,CR,100,200,20,,none,none/Daily/Weekly/Monthly
```

In a preferred embodiment, a conventional database engine is configured as described above for accommodating the storage methodology of the present invention. For instance, CodeBase™, a database engine (available from Sequiter Software, Inc., Edmonton, Alberta, Canada), may be employed as the Database Engine of the system 600. Preferably, the Database Engine 610 is CodeBase configured to use FoxPro's implementation of the dBASE file format with FoxPro indexes. FoxPro indexes are preferred since they are generally more compact (e.g., than dBASE indexes). Use of compressed indexes is particularly advantageous for maintenance of "dynamic" data fields of the present invention. Use of a dBASE-compatible file format, on the other hand, allows one to apply a variety of standard aforementioned database tools to the data. FoxPro's implementation is preferred as it provides more control over freeform or "memo" fields, such as the ability to alter block size (i.e., granularity) of the field. The latter aspect allows for smaller block sizes, thus reducing the storage requirement for implementing a dynamic field. The structure, layout, and operation of dBASE-compatible data files (.dbf) and FoxPro index files (.cdx) are well documented in the above-mentioned technical, trade, and patent literature.

Other advantages of the approach include reduced cost of implementation and increased data processing flexibility. Cost of implementing the system is reduced since "off the shelf" database engines may be employed for constructing the system. Besides costs, use of a traditional database engine has other advantages. In particular, a traditional database engine provides all the power of data maintenance and integrity. A relational database engine, such as CodeBase, already includes built-in support for searches, indexes, ad hoc queries, referential integrity, and the like.

B. Database Engine Interface

The Database Engine Interface 620 is the Application Programming Interface surfaced by the particular vendor of the Database Engine. It comprises a set of named functions which are the entry points by which functionality of the Database Engine 610 may be invoked. The Application Programming Interface for CodeBase is documented by its respective vendor. Alternatively, the Database Engine 610 may comprise Borland Database Engine, available from Borland International of Scotts Valley, Calif. With the Borland Database Engine as the Database Engine 610, the Application Programming Interface 620 comprises IDAPI—the API for the Borland Database Engine. IDAPI is documented in the programming guide accompanying the Borland Database Engine. As a further alternative, the Application Programming Interface 620 may comprises Microsoft's ODBC—Open Database Connectivity API. Database Engine 610 may comprise an engine supporting ODBC, such as Microsoft's Jet Engine, available from Microsoft Corporation of Redmond, Wash.

The Database Class Interface layer 640 isolates the Databank engine from the API (Application Programming Interface) of the conventional Database Engine employed. In this fashion, a different conventional Database Engine may be employed, yet the only change needed in the system is modification to the Database Interface layer. In other words, the database interface layer encapsulates any vendor-specific or other proprietary considerations of the conventional Database Engine's API. Although not necessary for operation of the Databank system, the "de-coupling" of the Database Engine API from the rest of the system allows for greater flexibility and is, therefore, the preferred embodiment. This interface will now be described in greater detail.

C. Databank Interface

The Databank layer functions to translate data processing tasks from the conventional database paradigm to the Databank paradigm. Consider, for example, a request received for "last name." A system using the conventional database paradigm would simply go to the relevant table and perform a lookup on a Last Name field (if any). In the system of the present invention, since such information would be stored in the dynamic field (as a logical field thereof), a simple lookup on last name using the database paradigm would return "not found." Adding the Databank paradigm, however, the system would then proceed to perform a lookup in the field descriptors (in the static fields) for locating a descriptor of Last Name. The system may then proceed to satisfy the request by retrieving the desired information from the dynamic field.

In an exemplary embodiment, the Database Class Interface 640 is constructed as an Object Pascal interface which maps the Database Engine API 620 into an object-oriented database interface (as opposed to the non-object oriented interface typically provided by conventional Database Engines). The Database Class Interface 640 may be implemented as an Object Pascal class, TTable, as follows:

```
TTable = class(TObject)
private
    d4: DATA4;
    dbFields: pTField;
    dbTags: pTTag;
    dbFlags: TDBFlags;
    dbEditRecNo: longint;
    dbEditRec: pChar;
    dbEditNew: boolean;
    destructor dbDestruct;
    procedure dbFreeMem(ptr: PtrRef);
    function dbPrepare: TDBError;
    function dbPrepChange: TDBError;
```

-continued

```
public
    dbFieldFound: boolean;
    function dbOpen(name: Pchar; var fields: array of TField;
                    var tags: array of TTAG): TDBError;
    function dbCreate(name: PChar; var fields: array of TField;
                     var tags: array of TTAG): TDBError;
    function dbClose: TDBError;
    function dbGetMemo(fldname: pChar; data: pChar; len: word):
        word;
    function dbPutMemo(fldname: pChar; data: pChar; len: word):
        TDBError;
    function dbGetData(fldname: pChar): pChar;
    function dbPutData(fldname: pChar; data: pChar): TDBError;
    function dbPutBlank(fldname: pChar): TDBError;
    function dbBlankRecord: TDBError;
    function dbSetOrder(value: pChar): pChar;
    function dbSeek(value: pChar): integer;
    function dbSeekLast(value: pChar): integer;
    function dbSkip(value: LongInt): TDBError;
    function dbIsEOF: boolean;
    function dbGoTop: TDBError;
    function dbGoBottom: TDBError;
    procedure dbGoEOF; virtual;
    procedure dbGoRec(rec: longint); virtual;
    function dbRecNo: longint;
    function dbIsDeleted: boolean;
    function dbAppendBlank: TDBError;
    function dbCommit: TDBError; virtual;
    function dbAbandon: TDBError;
    function dbNavigate(Button: TdbPos): boolean; virtual;
    function dbCheckRecord: TDBError; virtual;
    procedure dbNewPosition; virtual;
    function dbOptimize(b: boolean) :boolean;
    procedure dbBrowseInit;
    procedure dbBrowseExit;
end;
```

The class methods for the TTable class provide routine database functionality, such as open table (dbOpen), create table (dbCreate), and close table (dbClose). Operations at the record level include get data (dbGetData), put data (dbPutData), put blank (dbPutBlank), and blank record (dbBlankRecord). Other class methods correspond to analogous dBASE commands, such as Set Order, Seek, Skip, Go Top, Go Bottom, and the like.

As will be seen below, the TTable class serves as a base class—its methods and data members are inherited by other classes in the system. In this manner, other classes inherit the database functionality provided by the TTable class (which is an encapsulation of the database functionality provided by the Database Engine 610). In particular, the TTable class is inherited by the class for the Databank Engine, which will now be described.

D. Databank Engine

The Databank Engine 650 is implemented as an Object Pascal class, TDBank, as follows:

```
TDBank = class(TTable)
    DBankData: pChar;
    DBankRecNo: longint;
    DBankLen: word;
    DBankOffset: word;
    DBankChanged: boolean;
    LastChar: char;
    function dbCommit: TDBError; override;
    function GetBuffer(r: longInt): TDBError;
    function GetChar: char;
    function GetLine: char;
    function GetFld(nme: PChar): boolean;
    function GetDBankData(recno: LongInt; FldName: pChar;
                          Default: PChar; ReturnedString: PChar;
                          Size: Integer): Boolean;
    function PutDBankData(recno: LongInt;
```

```
            FldName, Data: pChar): Boolean;
  function GetCrossRef(recno: LongInt): LongInt;
  function PutCrossRef(recno, reference: LongInt): TDBError;
  function DelCrossRef(recno: LongInt): TDBError;
  function RunQuery(tag, name, form, album, date: pChar;
                    reference: longint;
                    decending: boolean;
                    QueryEvent: TQueryEvent): TDBError;
  function NewRecord: TDBError;
  function DeleteRecord: TDBError;
  function DeleteRecordEx: TDbError;
  {Only deletes dynamic part of record}
end;
```

As shown, the TDBank class inherits from the TTable class and, thus, inherits all of the database functionality provided by TTable (as described above).

The data members of the TDBank class are as follows. DBankData is a pointer to type character (char) and is set to point to the buffer for the dynamic data. DBankRecNo (Databank record number) is a long (32-bit) integer storing the record number to which this buffer (pointed to by DBankData) belongs. DBankLen (Databank length) describes the length for the data stored in the buffer. DBankOffset stores a particular offset into the buffer (e.g., useful for searching within the dynamic buffer). DBankChanged is a boolean or flag for indicating that the buffer has changed (i.e., one or more of its contents has changed). LastChar is a character data member and stores the is last character encountered during searching (e.g., for determining whether additional characters follow).

Next, the TDBank class definition defines methods or functions for processing (e.g., searching) the buffer: GetBuffer, GetChar, GetLine, and GetKey. Recall that the dynamic field is a freeform or memo field storing dynamic logical fields. These methods, therefore, provide the functionality for efficiently processing the logical fields of the dynamic field. GetBuffer functions to get the dynamic buffer for a passed in record number (r). GetChar returns the next character from the buffer. GetLine gets the next line (e.g., of text) from the buffer. GetKey determines whether a particular key or field (e.g., Last Name) is present in the dynamic buffer. Collectively, these routines manage the buffer. They find the appropriate data for particular search criteria, retrieve the data, and replace the data with something longer or shorter in size.

GetDBankData provides the core functionality for retrieving information from the dynamic field. In an exemplary embodiment, the method or function may be implemented as follows:

```
function TDBank.GetDBankData(recno: LongInt; FldName: pChar;
                Default: PChar; ReturnedString: PChar;
                Size: Integer): Boolean;
var c: char;
    i: integer;
    ref: Longint;
begin
  GetBuffer(recno);
  StrCopy(ReturnedString, dbGetData (FldName));
  result := dbFieldFound;
  if not result then
  begin
    result := GetFld(FldName);
    if (size < > 0) and (ReturnedString < > nil) then
    begin
      if result then
      begin
        if LastChar = '=' then
        begin
          repeat
            c := GetChar;
          until not IsWhiteSpace(c);
          i := 0;
          while (i < (size - 1)) and (not (c in [chr(0), chr(13)])) do
          begin
            ReturnedString[i] := c;
            inc(i);
            c := GetChar;
          end;
          while (i < > 0) and IsWhiteSpace(ReturnedString[i - 1]) do
            dec(i);
          ReturnedString[i] := chr(0);
        end
        else
          ReturnedString[0] := chr(0);
      end
      else
      begin
        ref := GetCrossRef(recno);
        if (ref < > 0) and (ref < > recno) then
        begin
          result := GetDBankData(ref, FldName, Default,
                                 ReturnedString, Size);
          dbGoRec(Recno);
        end
        else
          StrLCopy(ReturnedString, Default, Size);
      end;
    end;
  end;
end;
```

As shown, the method is invoked with a record number (Recno), a key or field name (FldName), a default value (Default), a pointer where to return the data (ReturnedString), and a size of the data returned (Size).

Figure 7:
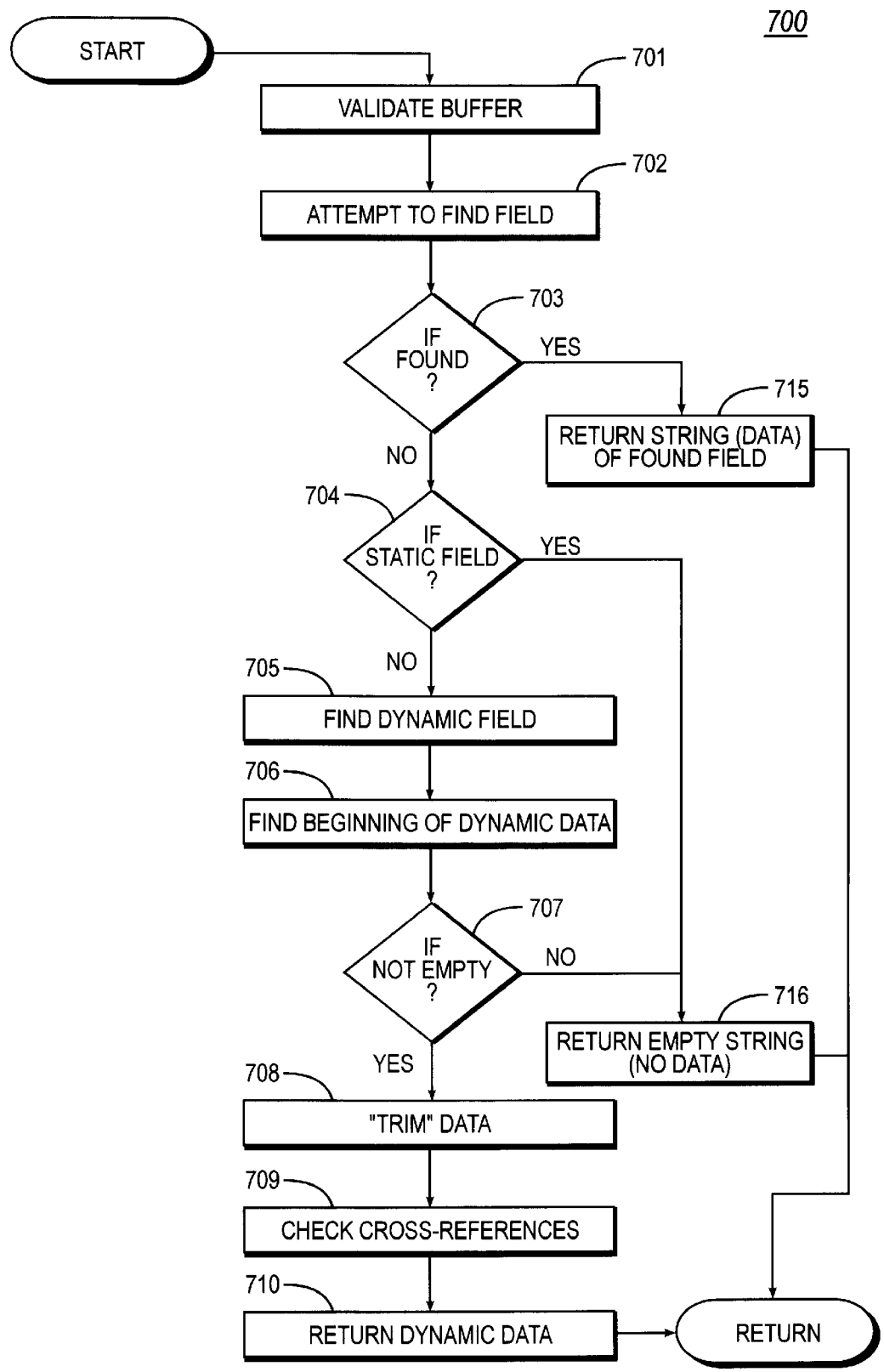
FIG. 7 is a flow chart illustrating a GetDBankData method of the present invention for retrieving data stored in the Databank.

FIG. 7 summarizes the steps of the GetDBankData method 700. At step 701, the method verifies that a valid buffer exists for the passed in record number; this is done by calling GetBuffer with the passed-in record number. Next, at step 702, the method calls dbGetData with the passed-in field name in an attempt to find the field as a "regular" database field. If the field is found, at step 703, then a "result" variable is set to "found" (dbFieldFound) and the field name is copied to a local string, at step 715. The field will be found if it is one of the conventional fields (i.e., static fields). If the field name is not found, on the other hand, then the method must proceed to determine whether the field is one of the dynamic logical fields. This is illustrated by step 704 where the method tests whether the field is a conventional (static) field. If the field is a static field, yet not found, then the method returns an empty string at step 716.

At step 705, the method traverses the buffer in search for a dynamic logical field satisfying the request (i.e., matching the field name passed in as a parameter to the method). In an exemplary embodiment, the equal sign character (i.e., "=") is employed as a delimiter—that is, separating a dynamic field name from its data. Those skilled in the art will appreciate that other delimiter characters may be employed, as desired. The delimiter character may be employed to determine the field apart from its data. Thus as step 705, the method proceeds to get the dynamic logical field which is desired (i.e., the one which matches the passed-in field name). Then, at step 706, the method finds the beginning of the data for that dynamic logical field; the beginning starts immediately after the delimiter character (i.e., immediately after the equal sign). If the beginning of the data is not empty (e.g., not NULL string), then at step 707 the method proceeds to build up a return string, for returning the found data. At step 708, the method "trims" (removes) any trailing white space characters and then NULL terminates the data (i.e., adding ASCII 0 to the end), so that it may be returned as a NULL-terminated data string. The default string is employed in the instance where neither a static field nor a dynamic logical field matches the passed in field name. The default string is not used, however, in the instance where a dynamic logical field is found but stores an empty string (i.e., is "blank"). In such an instance, the method returns an empty string.

At step 709, the method checks for cross references. A cross reference points to another, related record stored in the Databank. Consider, for instance, the task of tracking "To Do" items. In an exemplary embodiment, a recurring "To Do" is tracked by storing a master "To Do" record which defines the recurring "To Do" (e.g., daily, weekly, monthly, and the like). Additionally, the system stores instances of that "To Do" item as separate, additional records. Separate instance records are required because the user may in fact change the information for a particular "To Do" instance (e.g., changing the description, changing the due date, checking it off as completed, or the like). By defining a cross reference between instance records and their master, information common to all instances may be stored with the master, thus eliminating the need for storing redundant information (i.e., with each instance). In a preferred embodiment, each instance record only stores information which is different from the master record (i.e., only the "delta" information).

Since the Databank is implemented on top of a conventional Database Engine, all the features of the conventional engine may be employed to further process the data. For instance, links may be defined from one Databank dynamic logical field to another simply by defining an index on the logical fields desired to be linked. In this manner, the user may create links between database dynamic logical fields and other fields (dynamic or otherwise) simply by using the built-in indexing and linking features already provided by the conventional Database Engine. If a cross reference is located at step 709, then the method invokes itself recursively to get the Databank data for the parent record (i.e., the cross referenced record) of the current record. Otherwise, if the cross reference is not invoked (tested at step 710), then the method returns as the Databank data the return string which has been built up.

PutDBankData essentially performs the opposite function of GetDBankData: it puts or stores particular data in a given logical field of the dynamic field. In an exemplary embodiment, PutDBankData may be constructed as follows:

```
function TDBank.PutDBankData(recno: LongInt;
                            FldName, Data: pChar): Boolean;
var c: char;
    i, pos, delta, lenFld, lenData: word;
    procedure Copy(s: pChar; ofs: word);
var i: integer;
    begin
      i := 0;
      while s[i] < > chr(0) do
      begin
        DBankData[ofs] := s[i];
        inc(ofs);
        inc(i);
      end;
    end;
begin
  GetBuffer(recno);
  dbPutData(FldName, data);
  result := dbFieldFound;
  if not result then
```

-continued

```
  begin
    if DBankLen + 512 <= maxDBankData then
    begin
      if Data = nil then
        lenData := 0
      else
      lenData := StrLen(Data);
      lenFld := StrLen(FldName);
      result := GetFld(FldName);
      if not result then
      begin
        inc(DBankLen, lenFld);
        Copy(FldName, DBankOffset);
        inc(DBankOffset, lenFld);
      end;
      if LastChar < > '=' then
      begin
        inc(DBankLen);
        if LastChar < > chr(0) then
        begin
          move(DBankData[DBankOffset - 1],
               DBankData[DBankOffset],
               DBankLen - DBankOffset);
          dec(DBankOffset);
        end;
        DBankData[DBankOffset] := '=';
        inc(DBankOffset);
      end;
      pos := DBankOffset;
      if LastChar = '=' then
      begin
        repeat
          c := GetChar;
        until c in [chr(0), chr(13)];
        if c = chr(13) then dec(DBankOffset);
      end;
      i := lenData - (DBankOffset - pos);
      if (i < > 0) and (lastChar < > chr(0)) then
        move(DBankdata[DBankOffset],
             DBankdata[DBankOffset + i],
             DBankLen - DBankOffset + 1);
      if lenData < > 0 then Copy(Data, pos);
      DBankLen := DBankLen + i;
      if lastChar = chr(0) then
      begin
        DBankdata[DBankLen] := chr(13);
        inc(DBankLen);
        DBankdata[DBankLen] := chr(10);
        inc(DBankLen);
      end;
      DBankData[DBankLen] := chr(0);
      DBankChanged := true;
    end;
  end;
end;
```

In addition to storing data, the PutDBankData method must manage the buffer, including expanding and shrinking the buffer, and moving items around within the buffer (e.g., compaction). As shown, the method includes a nested procedure, Copy. The Copy nested procedure copies data from a source memory location to a target memory location, where the target is generally an offset into the Databank buffer.

Figure 8A:
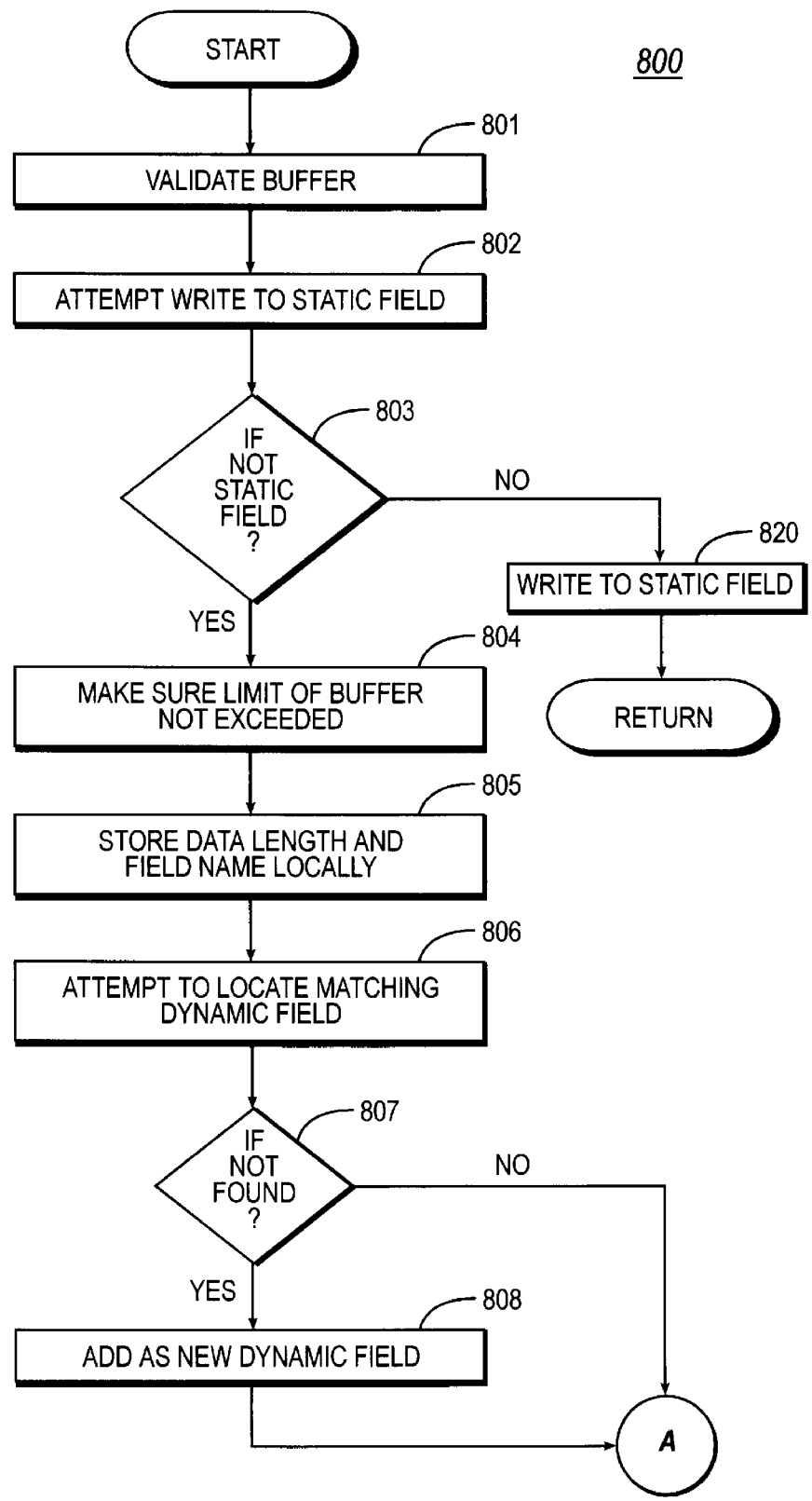
FIGS. 8A–B comprise a flow chart illustrating a PutDBankData method of the present invention, for storing data in the Databank.
Figure 8B:
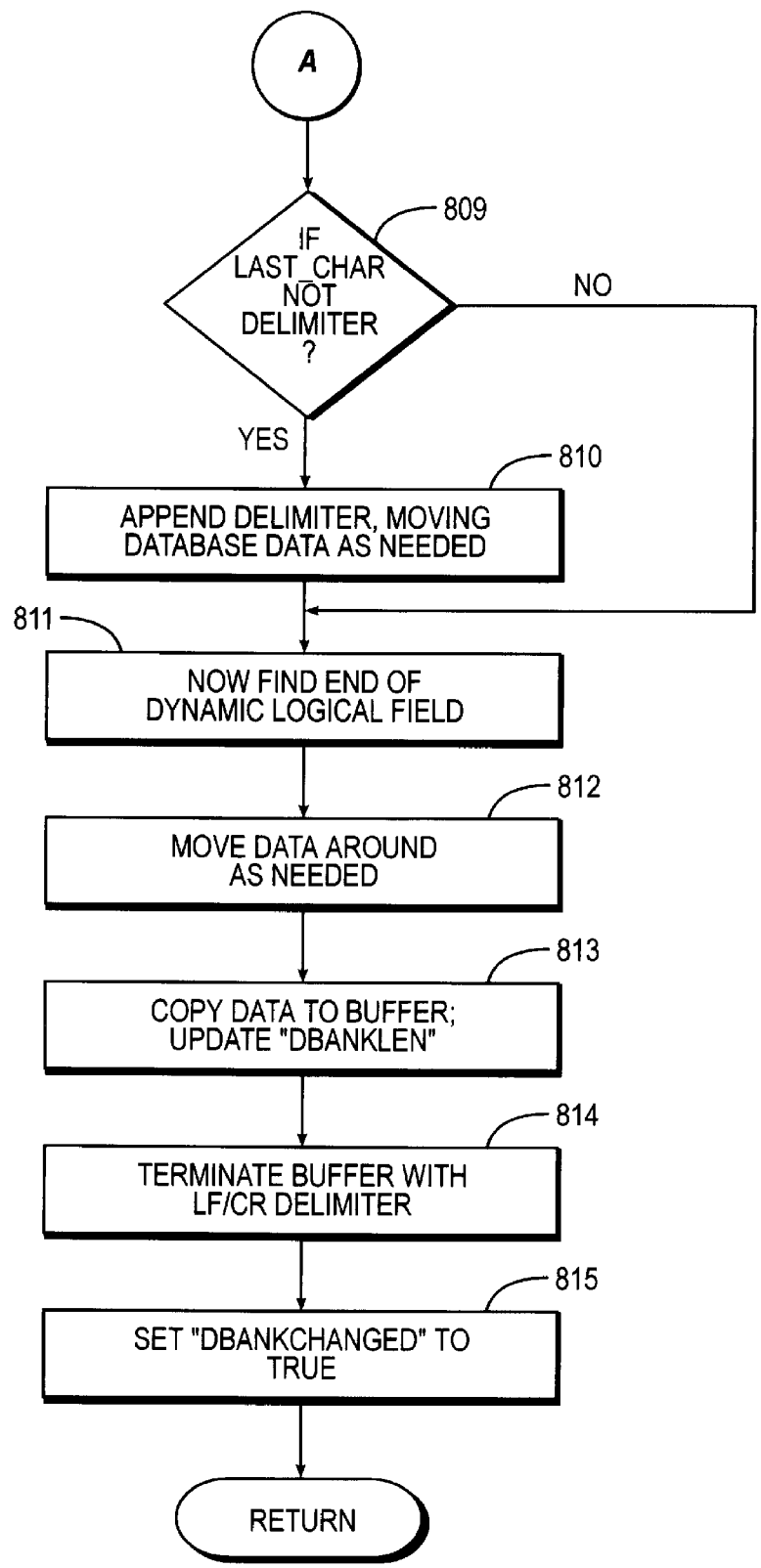

The steps of the PutDBankData method 800 proper, illustrated in FIGS. 8A–B, may be summarized as follows. At step 801, the method validates the buffer. Again, this is done by calling the GetBuffer routine with the current record number. Next, at step 802, the method attempts to write to a physical (i.e., static) field, by calling dbPutData with the passed-in field name. If the attempt fails (i.e., the field name is not found among the existing static fields), then the method proceeds to determine whether the field sought (as specified by the passed-in field name) exists as a dynamic logical field. At step 803, therefore, if the field sought is not among the static fields, then the method proceeds to look for the field among the dynamic fields. If it is a static field, however, then the information contained therein is simply returned from the field at step 820 and the method concludes.

At step 804, the method performs a safety check, making sure that the stored Databank data (DBankData buffer) will not exceed the maximum amount accommodated by the system. At step 805, the system examines the length (i.e., size) of the data to be stored and sets a local variable, lenData, accordingly. Similarly, the length of the field name is stored in a local variable, lenFld. At step 806, the method looks for a dynamic logical field matching the passed-in field name. If one is not found however (step 807), then the method proceeds to step 808 to add this field to the buffer as a new dynamic logical field. Specifically, this is done by growing the buffer, copying the field name for the new dynamic logical field into the buffer at its current offset, and then incrementing the current offset of the buffer to a position just beyond the copied-in field name.

At step 809, if the last character (LastChar) is not the delimiter, then at step 810 the method appends the delimiter to the buffer, moving Databank data as necessary; otherwise, step 810 is skipped. Upon finding the delimiter (i.e., equal sign char), the method next positions the buffer offset to the end of this dynamic field, at step 811, by looking for a carriage return (ASCII character 13) or a NULL terminator (ASCII character 0). At step 812, the method again moves data around in the buffer, if necessary, to accommodate the new data which is about to be stored (and whose length is already known from the local variable, lenData).

At step 813, the data stored is now actually copied into the Databank buffer; the length of the Databank buffer, which is tracked in a class variable, DBankLen, is updated accordingly. At step 814, the newly-stored data is now terminated by a line feed/carriage return delimiter if one has not been previously added (i.e. when the logical field was created by a prior iteration of the method); the end of the buffer itself (i.e., after all dynamic logical fields) is NULL terminated, by storing a NULL character. Finally, the class variable DBankChanged is set to true, at step 815, thereby indicating that the Databank buffer for this record has changed.

The scenarios of writing data to the Databank buffer may be summarized as follows. First, if a field does not exist, then it must be created (i.e., storing the field name), followed by the delimiter (i.e., storing the equal sign), and followed by the data (i.e., copy operation). Data are moved (including shrinking or growing the buffer) as necessary to accommodate the data to be stored. The second case is a simpler case in which the dynamic logical field already exists and the data to be stored are equal to the data present. In such a case, the data may simply be copied into the buffer, overriding the previously-stored data. A third case exists in which the dynamic logical field is present but the data to be stored are greater than or less than in size than the previously-stored data. In such a case, other dynamic logical field data are shifted, as necessary, to accommodate the newly-stored data.

Advantages

The static/dynamic field combination is particularly advantageous for storing non-uniform information. Since all non-uniform information is normalized for storage in a single table, standard database methodology may be employed for adding and deleting records (i.e., adding and deleting from the Databank). Further, since generic indexes (e.g., using conditional indexes available from dBASE or FoxPro) are employed, indexes for the information can be easily calculated. At the same time, the non-uniform data itself can be stored as a single block in an interpreted field. This affords very rapid lookups. Moreover, the field descriptors allow for storage optimization of data records in the data file: the data file need only store information which is different from the default (as described by the descriptor). If a boolean field defaults to a logical value of "true," then the data file need only store instances which are false (i.e., different from the default).

While the invention is described in some detail with specific reference to a single preferred embodiment and certain alternatives, there is no intent to limit the invention to that particular embodiment or those specific alternatives. For instance, those skilled in the art will appreciate that the present invention may be implemented with a dedicated database engine, in addition to the implementation described using a conventional database engine. Further, the preferred embodiment's implementation with a traditional database engine is but one implementation for generic indexes. A dedicated database engine could be built, for instance, which allowed generic indexing on any field. In a preferred embodiment, however, a traditional database engine is employed for reduced cost and for increased availability of standard database tools. Thus, the true scope of the present invention is not limited to any one of the foregoing exemplary embodiments but is instead defined by the appended claims.

What is claimed is:

1. In a data processing system for storing and processing a plurality of non-uniform data records storing information, each data record comprising a plurality of data fields, an improved method for storing said non-uniform data records, the method comprising:
   (a) storing in a single data record information from the data fields of each of said non-uniform data records together in a single free-form field of a single database table;
   (b) storing a set of field descriptors for describing each group of data records which are similar; and
   (c) storing in data fields associated with said free-form field information having a type which is uniform from one record to another.

2. The method of claim 1, wherein each said field descriptor for a field includes information describing how information stored in said field is to be displayed on screen.

3. The method of claim 2, wherein each said field descriptor for a field includes information describing a minimum size and a maximum size said field is to be displayed on screen.

4. In a computer database system, a method for rendering user data on a screen display, the method comprising:
   (a) storing said user data as a plurality of data records comprising a plurality of data fields, all stored in a database table;
   (b) storing for each of said data fields hints describing desired display characteristics of how said each data field is to be rendered on said screen display;
   (c) receiving a request for displaying a particular data record on said screen display; and
   (d) creating a screen form on-the-fly by:
      (i) reading the hint for each data field to be displayed on the form; and
      (ii) determining for each data field a relative position and size on the form based on information stored in the hints for said data fields to be displayed; and
   (e) displaying on said screen display said particular data record in said screen form created on-the-fly.

5. The method of claim 4, wherein said hints include information describing an orientation for rendering a data field relative to other data fields.

6. The method of claim 4, wherein said hints include information describing a data type of a data field to be rendered on screen.

7. The method of claim 4, wherein said hints include information describing a pick list to be displayed when a data field is rendered on screen.

8. The method of claim 4, wherein said hints include information describing a grouping of data fields which a particular data field is desired to appear with when rendered on screen.

9. The method of claim 4, further comprising:

(f) receiving a plurality of requests for rendering different combinations of data field from a particular data record; and (g) creating a plurality of different screen forms on-the-fly based on the hints stored for each combination of data fields as they are rendered.

10. In a computer database system, an improved method for browsing different types of data records, the method comprising:

(a) determining at least one field which said data records have in common;

(b) creating a generic index on said at least one field which said data records have in common;

(c) receiving a request to browse said different types of data records by said at least one field which said data records have in common; and (d) in response to step (c), displaying on a screen display said different types of data records ordered by said generic index.

11. The method of claim 10, wherein said different types of data records comprise at least one personal address record and at least one business address record type, each of which comprises at least one data field in common with the other.

12. The method of claim 11, wherein said at least one data field in common with the other comprises a last name field.

13. The method of claim 10, further comprising:

setting a filter condition for filtering out certain records from display, each of said certain records having a field value which does not satisfy the filter condition.

* * * * *